US009674875B2

(12) United States Patent
Uemura et al.

(10) Patent No.: US 9,674,875 B2
(45) Date of Patent: Jun. 6, 2017

(54) SMALL BASE STATION APPARATUS, BASE STATION APPARATUS, MOBILE STATION APPARATUS, AND MOBILE COMMUNICATION SYSTEM

(71) Applicant: SHARP KABUSHIKI KAISHA, Osaka-shi, Osaka (JP)

(72) Inventors: Katsunari Uemura, Osaka (JP); Hidekazu Tsuboi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/742,510

(22) Filed: Jun. 17, 2015

(65) Prior Publication Data
US 2015/0289294 A1    Oct. 8, 2015

Related U.S. Application Data

(60) Continuation of application No. 14/448,970, filed on Jul. 31, 2014, now Pat. No. 9,094,935, which is a
(Continued)

(30) Foreign Application Priority Data

Aug. 7, 2008    (JP) ................................ 2008-203789

(51) Int. Cl.
*H04W 76/00*    (2009.01)
*H04W 76/02*    (2009.01)
(Continued)

(52) U.S. Cl.
CPC ......... *H04W 76/007* (2013.01); *H04W 60/04* (2013.01); *H04W 72/005* (2013.01);
(Continued)

(58) Field of Classification Search
CPC ..... H04W 88/08; H04W 88/16; H04W 92/02; H04W 48/20; H04W 48/08; H04W 48/10;
(Continued)

(56) References Cited

U.S. PATENT DOCUMENTS 7,941,144 B2   5/2011   Nylander et al.
8,024,000 B2   9/2011   Wang et al.
(Continued)

FOREIGN PATENT DOCUMENTS

JP   2003-528506 A   9/2003
JP   2005-136779 A   5/2005
(Continued)

OTHER PUBLICATIONS

3GPP, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300 V8.4.0, Mar. 2008, pp. 1-126.
(Continued)

*Primary Examiner* — Nizar Sivji
(74) *Attorney, Agent, or Firm* — Birch, Stewart, Kolasch & Birch, LLP

(57) ABSTRACT

A mobile station apparatus receives an indication and access restriction information, where the indication indicating whether the cell is a Closed Subscriber Group (CSG) cell, where the CSG cell configured to restrict an access of the mobile station apparatus that are not being registered, and where the access restriction information indicating an access restriction related to an emergency call. The mobile station apparatus also transmits a connection request message for the emergency call based on the access restriction information, where the cell on which the mobile station apparatus
(Continued)

camped being the CSG cell and where the mobile station apparatus not registering the cell.

6 Claims, 21 Drawing Sheets

Related U.S. Application Data division of application No. 13/057,570, filed as application No. PCT/JP2009/062871 on Jul. 16, 2009, now Pat. No. 8,805,366.

(51) Int. Cl.

| | | |
|---|---|---|
| H04W 60/04 | (2009.01) | |
| H04W 72/00 | (2009.01) | |
| H04W 36/12 | (2009.01) | |
| H04W 48/02 | (2009.01) | |
| H04W 84/04 | (2009.01) | |
| H04W 88/02 | (2009.01) | |
| H04W 88/08 | (2009.01) | |

(52) U.S. Cl.
CPC .......... *H04W 76/027* (2013.01); *H04W 36/12* (2013.01); *H04W 48/02* (2013.01); *H04W 84/045* (2013.01); *H04W 88/02* (2013.01); *H04W 88/08* (2013.01)

(58) Field of Classification Search
CPC . H04W 48/18; H04W 36/0077; H04W 36/12; H04W 36/18; H04W 36/38; H04W 4/00; H04W 4/06; H04W 72/005; H04W 8/005; H04W 92/20; H04J 11/0069; H04J 11/0073; H04J 11/0076; H04J 11/0093; H04L 5/0023; H04L 63/104; H04M 2215/2033; H04M 2215/22; H04M 2215/32; H04H 20/57; H04H 60/44; H04H 60/51; H04H 60/85
See application file for complete search history.

(56) References Cited

U.S. PATENT DOCUMENTS

| | | |
|---|---|---|
| 2004/0192251 A1 | 9/2004 | Zhao et al. |
| 2005/0078654 A1 | 4/2005 | Rick et al. |
| 2005/0090278 A1 | 4/2005 | Jeong et al. |
| 2005/0147127 A1 | 7/2005 | Putcha et al. |
| 2005/0271018 A1 | 12/2005 | Liu et al. |
| 2006/0094397 A1 | 5/2006 | Raghuram et al. |
| 2007/0054668 A1 | 3/2007 | Scheinert et al. |
| 2007/0072542 A1 | 3/2007 | Haagen |
| 2007/0133492 A1 | 6/2007 | Baek et al. |
| 2007/0270152 A1 | 11/2007 | Nylander et al. |
| 2008/0039078 A1 | 2/2008 | Xu et al. |
| 2008/0267153 A1* | 10/2008 | Mukherjee ............ H04L 63/104 370/338 |
| 2009/0010228 A1 | 1/2009 | Wang et al. |
| 2009/0274086 A1 | 11/2009 | Petrovic et al. |
| 2010/0022250 A1 | 1/2010 | Petrovic et al. |
| 2010/0029283 A1 | 2/2010 | Iwamura |
| 2010/0309849 A1 | 12/2010 | Park et al. |
| 2011/0105129 A1 | 5/2011 | Kim et al. |
| 2011/0111745 A1 | 5/2011 | Li et al. |
| 2011/0177794 A1 | 7/2011 | Nylander et al. |
| 2011/0243108 A1 | 10/2011 | Park et al. |
| 2012/0113955 A1 | 5/2012 | Cho et al. |
| 2016/0050610 A1* | 2/2016 | Somasundaram ... H04J 11/0093 455/436 |

FOREIGN PATENT DOCUMENTS

| | | |
|---|---|---|
| JP | 2006-522549 A | 9/2006 |
| JP | 2007-134841 A | 5/2007 |
| JP | 2007-521777 A | 8/2007 |
| JP | 2007-534227 A | 11/2007 |
| WO | WO 01/72080 A1 | 9/2001 |
| WO | WO 2007/040449 A1 | 4/2007 |
| WO | WO 2007/066882 A1 | 6/2007 |
| WO | WO 2007/136339 A2 | 11/2007 |
| WO | WO 2008/040447 A1 | 4/2008 |
| WO | WO 2008/081816 A1 | 7/2008 |

OTHER PUBLICATIONS

3GPP, "Technical Specification Group Radio Access Network; Evolved Universal Terrestrial Radio Access (E-UTRA) Radio Resource Control (RRC); Protocol specification (Release 8)", 3GPP TS 36.331 V8.2.0, May 2008, pp. 1-151.
Huawei, "Cell selection/reselection in CSG-only coverage", 3GPP TSG-RAN WG2 Meeting #62bis, R2-083555, Warsaw, Poland, Jun. 30-Jul. 4, 2008.
International Preliminary Report on Patentability issued in PCT Application No. PCT/JP2009/062871 on Dec. 7, 2010.
International Search Report dated Oct. 27, 2009 for PCT/JP/2009/062871.
LG Electronics Inc., "Measurements on CSG cells", 3GPP TSG-RAN WG2 #62bis, R2-083479, Warsaw, Poland, Jun. 30-Jul. 4, 2008, pp. 1-3.
U.S. Corrected Notice of Allowance issued in U.S. Appl. No. 13/057,570 on Jul. 16, 2014.
U.S. Notice of Allowance issied in U.S. Appl. No. 13/057,570 on Mar. 10, 2014.
U.S. Notice of Allowance issued in U.S. Appl. No. 14/448,970 on Mar. 18, 2015.
U.S. Office Action issued in U.S. Appl. No. 13/057,570 on Dec. 23, 2013.
U.S. Office Action issued in U.S. Appl. No. 13/057,570 on May 10, 2013.
U.S. Office Action issued in U.S. Appl. No. 13/057,570 on Oct. 11, 2011.
U.S. Office Action issued in U.S. Appl. No. 14/448,970 on Oct. 10, 2014.

* cited by examiner

SMALL BASE STATION APPARATUS, BASE STATION APPARATUS, MOBILE STATION APPARATUS, AND MOBILE COMMUNICATION SYSTEM

This application is a Continuation of application Ser. No. 14/448,970, filed on Jul. 31, 2014, which is a Divisional of application Ser. No. 13/057,570, filed on Mar. 1, 2011 (which issued as U.S. Pat. No. 8,805,366 on Aug. 12, 2014), which was filed as PCT International Application No. PCT/JP2009/062871 on Jul. 16, 2009, which claims the benefit under 35 U.S.C. §119(a) to Patent Application No. 2008-203789, filed in Japan on Aug. 7, 2008, all of which are hereby expressly incorporated by reference into the present application.

TECHNICAL FIELD

The present invention relates to a technology for accessing a small base station apparatus in a mobile communication system in which the small base station apparatus is provided.

BACKGROUND ART

In recent years, small base station apparatuses placed in houses and offices have been under consideration. A small base station apparatus is connected to a fixed line or the like in a house and used to expand the communication area or provide user-specific services. The small base station apparatus being developed in a standardization group 3GPP (3rd Generation Partnership Project) is referred to as a Home Node B (or Home e Node B). In addition, the Home Node B that restricts users who can use it by preliminarily registering users who can access it is specifically referred to as a CSG (Closed Subscriber Group) cell (see Non-patent Document 1). On the other hand, an ordinary base station apparatus is referred to as a macro cell and distinguished therefrom.

In 3GPP, CSG cells are under consideration for Evolved Universal Terrestrial Radio Access (referred to as "EUTRA", hereinafter) which has evolved the third generation mobile communication system, and Advanced EUTRA which is its further developed system.

A mobile station apparatus may waste power consumption and radio resource by trying access to an inaccessible CSG cell unless it can distinguish a CSG cell in which the mobile station apparatus is already registered as a subscriber (registered CSG cell), a CSG cell in which it is not registered (unregistered CSG cell), and a macro cell. Therefore, a method of including a CSG cell identifier in broadcast information (see section 6.3.1 of Non-patent Document 2) has been proposed as a method for a mobile station apparatus to distinguish a CSG cell from a macro cell.

FIG. 19 is a sequence chart showing an initial access procedure of a mobile station apparatus when a registered CSG cell is placed among neighboring cells. First, a mobile station apparatus CSG_UE acquires CSG cell information from the CSG cell (step S191). The CSG cell information is acquired from a CSG cell to distinguish a macro cell from the CSG cell, and corresponds to a CSG cell identifier, a cell ID, and frequency band of the broadcast information. The mobile station apparatus determines, in a idle determination process (step S192), whether or not the CSG cell detected from the acquired CSG cell information is a registered CSG cell. If, according to the result of this determination, it is a registered CSG, a wireless connection request message is transmitted to the registered CSG cell (step S193). The CSG cell which received the wireless connection request transmits a wireless connection request permission message (step S194), and subsequently a wireless connection completion message is transmitted from the mobile station apparatus (step S195).

The mobile station apparatus subsequently performs a location registration process (step S196). It thereby notifies the network of an area where it waits for an terminated call signal, and enters a idle state. Entering the idle state is referred to as "camping on a cell". When the mobile station apparatus subsequently starts a originated call procedure for data communication according to an instruction from an upper layer or the like, it transmits a originated call request message to a CSG cell on which it is camping (step S197), and the CSG cell responds with a originated call request permission message (step S198).

FIG. 20 is a sequence chart showing an initial access procedure when an unregistered CSG cell is placed among neighboring cells, or when the mobile station apparatus does not support a CSG cell. First, a mobile station apparatus Non-CSG_UE acquires CSG cell information from the CSG cell (step S201). The mobile station apparatus determines, in the idle determination process (step S202), whether or not the CSG cell detected from the acquired CSG cell information is a registered CSG cell. If, according to the result of the determination, it is not a registered CSG, or the mobile station apparatus does not support a CSG cell, it transmits a wireless connection request message to a macro cell (step S203). The macro cell which received the wireless connection request transmits a wireless connection request permission message (step S204), and subsequently a wireless connection completion message is transmitted from the mobile station apparatus (step S205).

The mobile station apparatus subsequently performs a location registration process (step S206), and notifies the network that it will camp on the macro cell. Subsequently, when starting a originated call procedure, the mobile station apparatus transmits a originated call request message to the macro cell on which it is camping (step S207), and the macro cell responds with a originated call request permission message (step S208).

Although there may be a case where a random access procedure is actually required for an uplink resource request prior to transmission of a wireless connection request message and a originated call request message in FIGS. 19 and 20, description thereof is omitted for simplicity.

FIG. 21 is a flow chart showing a procedure of the idle determination process shown in FIGS. 19 and 20. When selecting a cell to be camped on, the mobile station apparatus first receives signals from neighboring cells and selects one or more neighboring cells satisfying a reception quality suitable for camping (step S211). Next, it is determined, based on the CSG cell information, whether or not a CSG cell is placed among neighboring cells and a signal of the CSG cell is included in the reception signal (step S212). If a CSG cell is placed among neighboring cells, it is next determined whether or not the CSG cell is a registered CSG cell (step S213). If the CSG cell is a registered CSG cell, the registered CSG cell is selected as the cell to be camped on (step S214). On the other hand, if no CSG cell is placed among neighboring cells in step S212, or if only unregistered CSG cells are placed in step S213, the macro cell is selected as the cell to be camped on (step S215).

In addition, there is made a proposal in Non-patent Document 3 enabling a priority call (urgent call, emergency communication) to camp even on an unregistered CSG cell in a cell environment where only CSG cells are observed.

Non-patent Document 1: 3GPP TS36.300, Overall description; Stage2.V8.4.0 http://www.3gpp.org/ftp/Specs/html-info/36300.htm Non-patent Document 2: 3GPP TS36.331, Radio Resource Control(RRC); Protocol specification.V8.2.0 http://www.3gpp.org/ftp/Specs/html-info/36331.htm Non-patent Document 3: Huawei, R2-083555, 3GPP TSG-RAN2 Meeting #62bis, Warsaw, Poland, Jun. 30-Jul. 4, 2008

DISCLOSURE OF THE INVENTION

Problems to be Solved by the Invention

For a type of communication such as a priority call which should be prioritized over a normal call, however, it is always necessary to permit originated call regardless of whether or not the cell is a CSG cell. Although it has been necessary to permit idle even for an unregistered CSG cell in order to satisfy the need, no access procedure to an unregistered CSG cell has been conventionally defined for this case. In particular, no access procedure has been defined for a case where the mobile station apparatus performs a originated call procedure other than a priority call.

It is an object of the present invention, which has been conceived in view of the above circumstances, to define a procedure for a mobile station apparatus to access an unregistered CSG cell, and to provide a small base station apparatus, a base station apparatus, a mobile station apparatus, and a mobile communication system which perform a procedure based on the definition.

Means for Solving the Problems (1) In order to achieve the above object, the present invention has taken the following measures. In other words, a small base station apparatus of the present invention, which is a small base station apparatus applied to a mobile communication system, receives a originated call request message including a user identifier and priority information from a camping mobile station apparatus, determines whether or not to permit the originated call request of the mobile station apparatus, based on the user identifier and the priority information, and transmits the determination result to the mobile station apparatus.

As thus described, an appropriate access procedure can be realized according to the registration relation and priority of communication in mobile station apparatuses, because the small base station apparatus receives a originated call request message including a user identifier and priority information from a camping mobile station apparatus, determines whether or not to permit the originated call request of the mobile station apparatus, based on the user identifier and priority information, and transmits the determination result to the mobile station apparatus.

(2) In addition, the small base station apparatus of the present invention permits the originated call request, if the user identifier included in the originated call request message of the mobile station apparatus indicates that the mobile station apparatus is registered.

Accordingly, if the user identifier included in the originated call request message of the mobile station apparatus indicates that the mobile station apparatus has been already registered, an appropriate access procedure can be realized according to the registration relation and priority of communication in mobile station apparatuses, because the small base station apparatus permits the originated call request.

(3) In addition, the small base station apparatus of the present invention permits the originated call request, if the priority information included in the originated call request message of the mobile station apparatus indicates that the call is a priority call.

Accordingly, if the priority information included in the originated call request message of the mobile station apparatus indicates that the call is a priority call, an appropriate access procedure can be realized according to the registration relation and priority of communication in mobile station apparatuses, because the small base station apparatus permits the originated call request.

(4) In addition, the small base station apparatus of the present invention, which is a small base station apparatus applied to a mobile communication system, receives a originated call request message including a user identifier and priority information from a camping mobile station apparatus, transfers the originated call request message to a preliminarily defined base station apparatus, if the user identifier included in the originated call request message of the mobile station apparatus indicates that the mobile station apparatus is unregistered and the priority information indicates that the call is a normal call, and transmits, to the mobile station apparatus, a response from the preliminarily defined base station apparatus to the transferred originated call request message.

Accordingly, if the user identifier included in the originated call request message of the mobile station apparatus indicates that the mobile station apparatus is unregistered and the priority information indicates that the call is a normal call, the base station apparatus can appropriately determine a cell to communicate with the mobile station apparatus whereby the originated call success rate rises and the number of call interruptions can be reduced, because the small base station apparatus transfers the originated call request message to a preliminarily defined base station apparatus and transmits, to the mobile station apparatus, the response from the preliminarily defined base station apparatus to the transferred originated call request message.

(5) In addition, the small base station apparatus of the present invention, which is a small base station apparatus applied to a mobile communication system, receives a originated call request message including a user identifier and priority information from a camping mobile station apparatus and, if the user identifier included in the originated call request message of the mobile station apparatus indicates that the mobile station apparatus is unregistered, transfers the originated call request message to a preliminarily defined base station apparatus, and transmits, to the mobile station apparatus, information of the preliminarily defined base station apparatus included in the response from the preliminarily defined base station apparatus to the transferred originated call request message.

Accordingly, if the user identifier included in the originated call request message of the mobile station apparatus indicates that the mobile station apparatus is unregistered, the base station apparatus can appropriately determine a cell to communicate with the mobile station apparatus whereby the originated call success rate rises and the number of call interruptions can be reduced, because the small base station apparatus transfers the originated call request message to a preliminarily defined base station apparatus and transmits, to the mobile station apparatus, information of the preliminarily defined base station apparatus included in the response from the preliminarily defined base station apparatus to the transferred originated call request message.

(6) In addition, the small base station apparatus of the present invention, which is a small base station apparatus applied to a mobile communication system, receives a originated call request message including a user identifier and priority information from a camping mobile station apparatus and, if the user identifier included in the originated call request message of the mobile station apparatus indicates that the mobile station apparatus is unregistered, transmits information of the preliminarily defined base station apparatus to the mobile station apparatus, without permitting the originated call request message.

Accordingly, if the user identifier included in the originated call request message of the mobile station apparatus indicates that the mobile station apparatus is unregistered, it becomes possible to continuously request a originated call to another preferable cell even if the originated call request is rejected whereby the originated call success rate rises and the number of call interruptions can be further reduced, because the small base station apparatus transmits information of the preliminarily defined base station apparatus to the mobile station apparatus, without permitting the originated call request message.

(7) In addition, the small base station apparatus of the present invention, which is a small base station apparatus applied to a mobile communication system, receives a originated call request message including a user identifier and priority information from a camping mobile station apparatus and, if the user identifier included in the originated call request message of the mobile station apparatus indicates that the mobile station apparatus is unregistered, transmits, to the mobile station apparatus, a wireless connection release message having information of the preliminarily defined base station apparatus included therein, without permitting the originated call request message.

Accordingly, if the user identifier included in the originated call request message of the mobile station apparatus indicates that the mobile station apparatus is unregistered, it becomes possible to continuously request a originated call to another preferable cell even if the originated call request is rejected whereby the originated call success rate rises and the number of call interruptions can be further reduced, because the small base station apparatus transmits a wireless connection release message having information of the preliminarily defined base station apparatus included therein to the mobile station apparatus, without permitting the originated call request message.

(8) In addition, the small base station apparatus of the present invention, which is a small base station apparatus applied to a mobile communication system, receives a originated call request message including a user identifier and priority information from a camping mobile station apparatus and, if the user identifier included in the originated call request message of the mobile station apparatus indicates that the mobile station apparatus is unregistered, transmits, to the mobile station apparatus, a originated call request rejection message having information of the preliminarily defined base station apparatus included therein, without permitting the originated call request message.

Accordingly, if the user identifier included in the originated call request message of the mobile station apparatus indicates that the mobile station apparatus is unregistered, it becomes possible to continuously request a originated call to another preferable cell even if the originated call request is rejected whereby the originated call success rate rises and the number of call interruptions can be further reduced, because the small base station apparatus transmits a originated call request rejection message having information of the preliminarily defined base station apparatus included therein to the mobile station apparatus, without permitting the originated call request message.

(9) In addition, the base station apparatus of the present invention, which is a base station apparatus applied to a mobile communication system including a small base station apparatus, receives a originated call request message including a user identifier and priority information of a mobile station apparatus transferred from the small base station apparatus, determines whether or not to permit the originated call request from the mobile station apparatus to the small base station apparatus, based on the user identifier and the priority information, and transmits the determination result to the small base station apparatus.

Accordingly, the base station apparatus can appropriately determine a cell to communicate with the mobile station apparatus whereby the originated call success rate rises and the number of call interruptions can be reduced, because the base station apparatus determines whether or not to permit the originated call request from the mobile station apparatus to the small base station apparatus based on the user identifier and priority information and transmits the determination result to the small base station apparatus.

(10) In addition, the base station apparatus of the present invention permits the originated call request from the mobile station apparatus to the small base station apparatus, if the priority information included in the originated call request message transferred from the small base station apparatus indicates that the call is a priority call.

Accordingly, if the priority information included in the originated call request message transferred from the small base station apparatus indicates that the call is a priority call, an appropriate access procedure can be realized according to the registration relation and priority of communication in mobile station apparatuses, because the base station apparatus permits the originated call request from the mobile station apparatus to the small base station apparatus.

(11) In addition, the base station apparatus of the present invention permits the originated call request from the mobile station apparatus to its own station, if the priority information included in the originated call request message transferred from the small base station apparatus indicates that the call is a normal call and the own station has resources available to accommodate the call.

Accordingly, if the priority information included in the originated call request message transferred from the small base station apparatus indicates that the call is a normal call and the base station has resources available to accommodate the call, an appropriate access procedure can be realized according to the registration relation and priority of communication in mobile station apparatuses, because the base station apparatus permits the originated call request from the mobile station apparatus to the own station.

(12) In addition, the base station apparatus of the present invention searches for a nearby base station apparatus that can accommodate the mobile station apparatus and permits the originated call request from the mobile station apparatus to the nearby base station apparatus, if the priority information included in the originated call request message transferred from the small base station apparatus indicates that the call is a normal call and its own station apparatus does not have resources available to accommodate the call.

Accordingly, if the priority information included in the originated call request message transferred from the small base station apparatus indicates that the call is a normal call and the base station apparatus does not have resources available to accommodate the call, the base station apparatus can appropriately determine a cell to communicate with the mobile station apparatus whereby the originated call success rate rises and the number of call interruptions can be reduced, because the base station apparatus searches for a nearby base station apparatus that can accommodate the mobile station apparatus and permits the originated call request from the mobile station apparatus to the nearby base station apparatus.

(13) In addition, the mobile station apparatus of the present invention, which is a mobile station apparatus applied to a mobile communication system, if camping on a small base station apparatus in which its own station is unregistered, transmits a originated call request message having a user identifier and priority information included therein to the small base station apparatus, receives a response to the originated call request message transmitted from the small base station apparatus, and selects a base station apparatus to which the mobile station apparatus transmits a originated call procedure completion message, based on information of the base station apparatus included in the response.

Accordingly, if the mobile station apparatus is camping on a small base station apparatus in which its own station is unregistered, a cell for communication can be appropriately determined whereby the originated call success rate rises and the number of call interruptions can be reduced, because the mobile station apparatus transmits a originated call request message having a user identifier and priority information included therein to the small base station apparatus, receives a response to the originated call request message transmitted from the small base station apparatus, and selects a base station apparatus to which the mobile station apparatus transmits a originated call procedure completion message, based on information of the base station apparatus included in the response.

(14) In addition, the mobile station apparatus of the present invention, which is a mobile station apparatus applied to a mobile communication system, if camping on a small base station apparatus in which its own station is unregistered, transmits a originated call request message having a user identifier and priority information included therein to the small base station apparatus, receives a response to the originated call request message transmitted from the small base station apparatus, and selects a base station apparatus to which the mobile station apparatus transmits a originated call request message, based on information of the base station apparatus included in the response.

Accordingly, if the mobile station is camping on a small base station apparatus in which its own station is unregistered, a cell for communication can be appropriately determined whereby the originated call success rate rises and the number of call interruptions can be reduced, because the mobile station apparatus transmits a originated call request message having a user identifier and priority information included therein to the small base station apparatus, receives a response to the originated call request message transmitted from the small base station apparatus, and selects a base station apparatus to which the mobile station apparatus transmits a originated call request message, based on information of the base station apparatus included in the response.

(15) In addition, the mobile station apparatus of the present invention acquires access restriction information from broadcast information when transmitting the originated call request message and performs access restriction on transmission control of the originated call request message, based on information of a type of a originated call destination cell, whether or not it is registered in the small base station apparatus, and a type of call.

Accordingly, a mobile station apparatus registered as a subscriber can access more advantageously than an unregistered mobile station apparatus, because the mobile station apparatus acquires access restriction information from the broadcast information when transmitting a originated call request message and performs access restriction on transmission control of the originated call request message based on information of the type of originated call destination cell, whether or not it is registered in the small base station apparatus, and the type of call.

(16) In addition, a mobile communication system of the present invention may comprise the small base station apparatus (e.g., as described above), the base station apparatus (e.g., as described above), and the mobile station apparatus (e.g., as described above).

With the above arrangements, an appropriate access procedure can be realized according to the registration relation and priority of communication in mobile station apparatuses.

Effects of the Invention

According to the present invention, an appropriate access procedure can be realized according to the registration relation and priority of communication in mobile station apparatuses.

Figure 1:
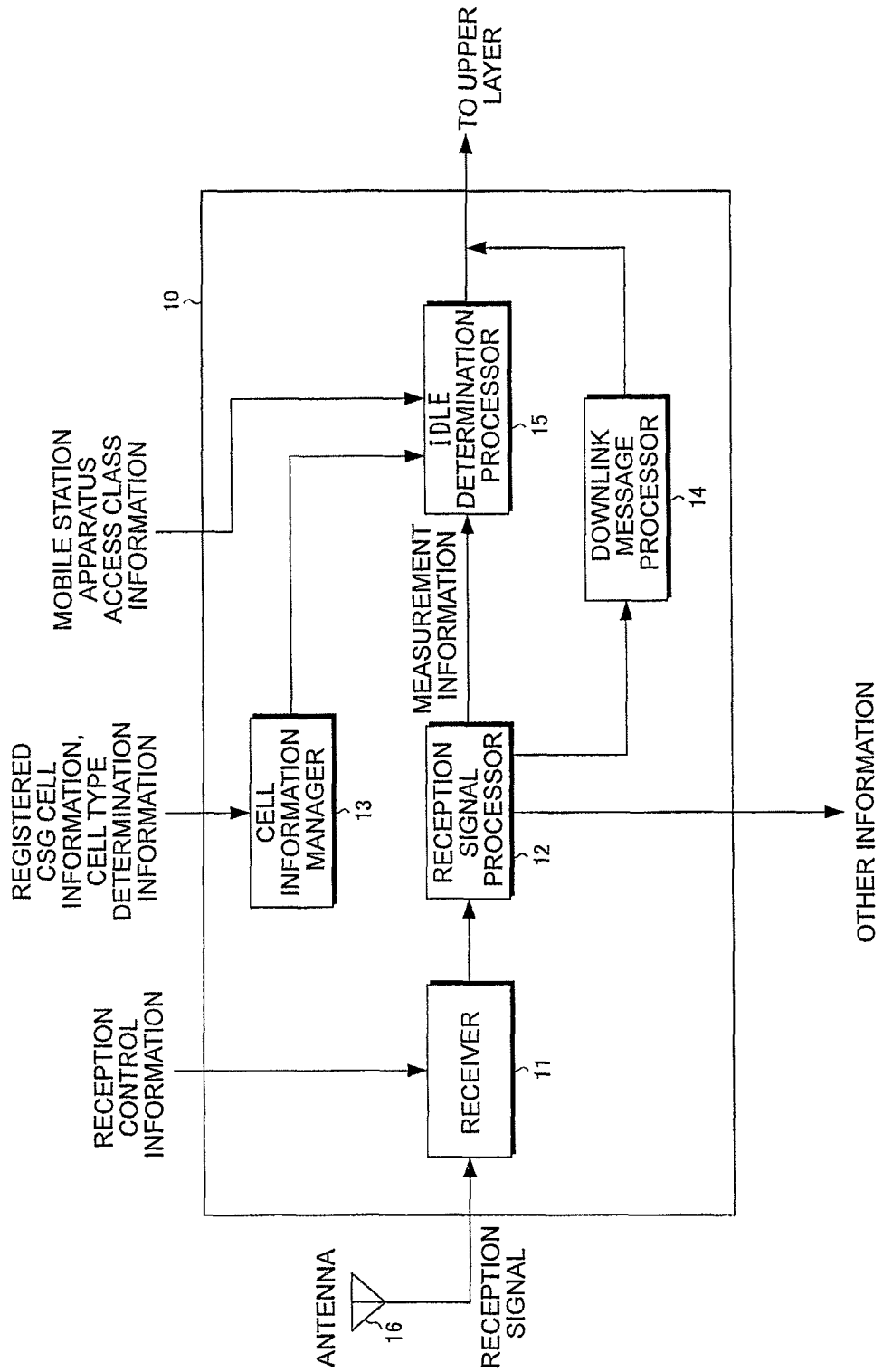
FIG. 1 is a block diagram showing a general configuration of a reception unit of a mobile station apparatus according to a first embodiment of the present invention.

DENOTATION OF REFERENCE NUMERALS 10 reception unit
11 receiver
12 reception signal processor
13 cell information manager
14 downlink message processor
15 idle determination processor
16 antenna
20 transmission unit
21 uplink message generator
22 transmission signal processor
23 transmitter
24 antenna
30 reception unit
31 receiver
32 reception signal processor
33 uplink message processor
34 inter-base station message processor
35 antenna
40 transmission unit
41 CSG cell information generator
42 downlink message generator
43 transmission signal processor
44 transmitter
45 request determination device
46 antenna

BEST MODES FOR CARRYING OUT THE INVENTION

Next, an embodiment according to the present invention will be described referring to the drawings. As physical channels for use in EUTRA and Advanced EUTRA, there are a broadcast channel, an uplink data channel, a downlink data channel, a downlink shared control channel, an uplink shared control channel, a random access channel, a synchronization signal, a downlink reference signal, and the like.

Although physical channels for EUTRA and Advanced EUTRA may be added or subject to change in the channel structure in future, description of each embodiment of the present invention will not be influenced by any possible change. In addition, there are a downlink reference signal and an uplink reference signal as reference signals.

Since the physical channels according to each embodiment of the present invention are a synchronization signal, a broadcast channel, and a downlink reference signal, detailed description of other physical channels is omitted.

A synchronization signal is used by a mobile station apparatus to detect a base station apparatus at a high speed. The synchronization signal comprises three types of primary synchronization signals and a secondary synchronization signal having 31 types of codes alternately arranged, and a signal combination of the primary synchronization signal and the secondary synchronization signal indicates 504 types of cell IDs that identify the base station apparatus and frame timing for radio synchronization.

A broadcast channel (BCH) is transmitted for the purpose of notifying a control parameter commonly used by mobile station apparatuses in a cell. Furthermore, a BCH is classified into a P-BCH (Primary BCH) and a D-BCH (Dynamic BCH). Because it is preliminarily defined to transmit the P-BCH with a predetermined cycle in terms of time and frequency, the mobile station apparatus can receive a P-BCH of a cell whose cell ID has been identified. With regard to D-BCH, on the other hand, a transmission resource is notified in the downlink shared control channel so that the transmission resource can be varied for each cell. A D-BCH includes a global ID (also referred to as global cell ID) which is at least larger in value than the cell ID and assigned only one so as not to overlap with any one of the cells, and area information (also referred to as tracking area or tracking area ID).

A downlink reference signal is a pilot signal which is in principle transmitted with predetermined electric power for each cell. In addition, the downlink reference signal is a signal periodically repeated with a predetermined time interval (one frame, for example), and the mobile station apparatus determines the reception quality for each cell by receiving the downlink reference signal with a predetermined time interval and measuring its reception quality. In addition, it is used as a reference signal for demodulation of downlink data transmitted simultaneously with the downlink reference signal. Any sequence may be used for the downlink reference signals provided that it is a sequence which can uniquely identify each cell. Note that the downlink reference signal may be denoted by DL-RS (Downlink Reference Signal) whose usage and meaning are the same.

First Embodiment

FIG. 1 is a block diagram showing a general configuration of a reception unit of a mobile station apparatus according to a first embodiment of the present invention. A reception unit 10 comprises a receiver 11, a reception signal processor 12, a cell information manager 13, a downlink message processor 14, a idle determination processor 15, and an antenna 16. The reception signal (transmission signal from the base station apparatus) is received by the receiver 11 via the antenna 16. In the receiver 11, the reception signal is demodulated based on reception control information indicating the channel schedule. The reception control information includes information about reception timing, a multiplexing method, resource allocation information, and demodulation for each channel. The receiver 11 demodulates/decodes the reception signal for each channel according to the reception control information, and outputs it to the reception signal processor 12.

The cell information manager 13 receives registered CSG cell information and cell type determination information. The registered CSG cell information includes information that can uniquely identify CSG cells in which the mobile station apparatus is registered. The registered CSG cells in which the mobile station apparatus is registered are listed, and the list includes all or a part of information such as, for example, area information, CSG cell ID (also referred to as CSGID), frequency, bandwidth, global ID, communication method, GPS information, IP address, and the like. These pieces of information may be prepared as a plurality of sets if there is a plurality of CSG cells in which a mobile station apparatus is registered and, furthermore, any registration method may be employed. Although the memory in a SIM (Subscriber Identity Module) card is suitable for storing the registered CSG cell information of a mobile station apparatus, this is not limiting. In addition, the cell type determination information includes information for distinguishing a CSG cell from a macro cell. For example, all or apart of information such as a cell ID used only by the CSG cell, frequency band, correspondence relation between the CSG cell identifier acquired from the broadcast information and the cell ID. The cell information manager 13 outputs these pieces of information to the idle determination processor 15.

The reception signal processor 12 appropriately processes input signals from the receiver 11 for each channel and furthermore, outputs required measurement information acquired by performing measurement to the idle determination processor 15. The measurement information includes cell ID detected from the synchronization signal, reception quality of the downlink reference signal, area information acquired from the broadcast information, or the like. In addition, messages received from the upper layer (layer 3 messages) are input to the downlink message processor 14. Information other than the measurement information processed by the reception signal processor 12, for example, user traffic data or downlink control data, are input to individual processing blocks as other information, description thereof is however omitted since they are irrelevant to the present invention.

The idle determination processor 15 receives measurement information from the reception signal processor 12, registered CSG cell information and cell type determination information from the cell information manager 13 and, if necessary, mobile station apparatus access class information. The mobile station apparatus access class information is information for determining the priority when the mobile station apparatus performs communication. For example, a higher priority is set to a dedicated mobile station apparatus used by an operator for maintenance than a commercially available mobile station apparatus. In addition, priority is also set according to the type of call, where the priority of a priority call (emergency calls such as 110 and 119, in the case of Japan) is set higher than normal communication. Control is performed in such a manner that the higher the priority is, the shorter the transmission waiting time when making a originated call, and radio resources are allocated with a higher priority. There are also cases, other than those described above, where a communication control which is different from that on a normal call is applied, such as performing data communication with a higher transmission or reception power. The idle determination processor 15 selects a cell to camp on, based on measurement information, registered CSG cell information, cell type determination information, and mobile station apparatus access class information, and notifies an upper layer of the selection result.

The downlink message processor 14 receives a message from the base station apparatus, performs a control according to the content of the message and notifies an upper layer of the result.

Figure 2:
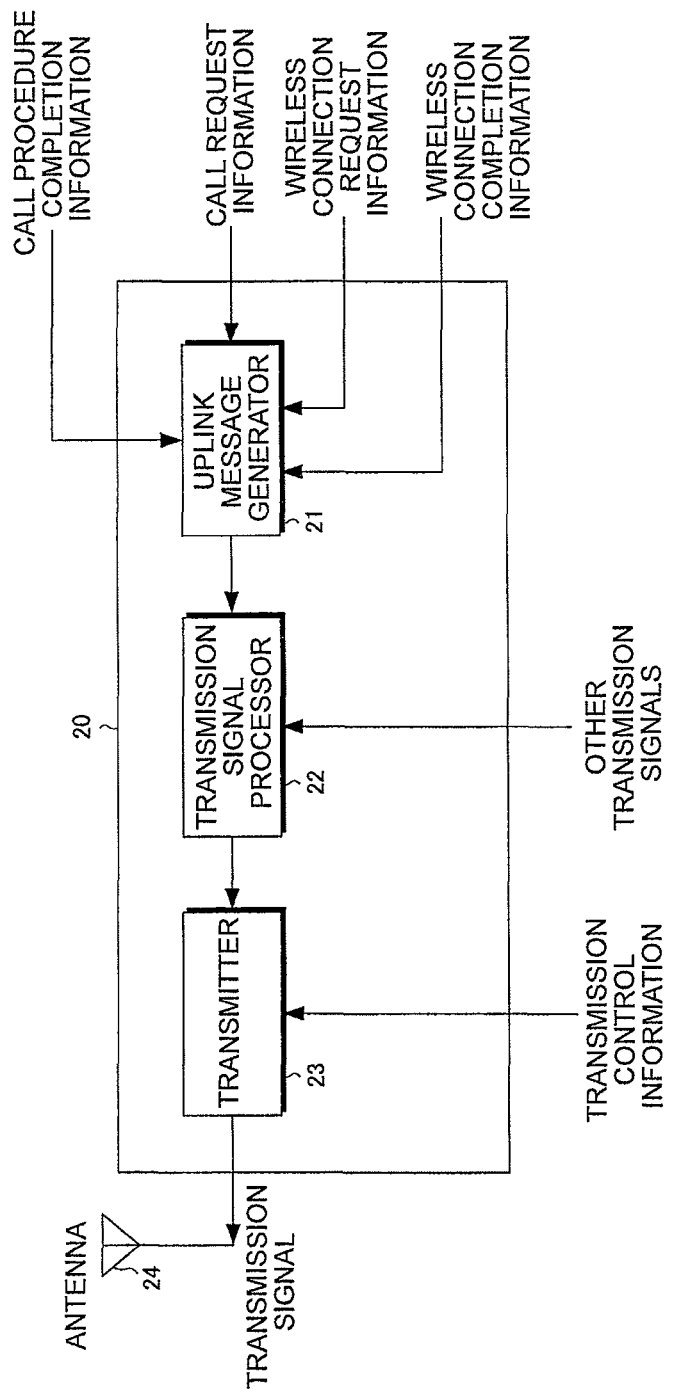
FIG. 2 is a block diagram showing a general configuration of a transmission unit of the mobile station apparatus according to the first embodiment of the present invention.

FIG. 2 is a block diagram showing a general configuration of a transmission unit of the mobile station apparatus according to the first embodiment of the present invention. A transmission unit 20 comprises an uplink message generator 21, a transmission signal processor 22, a transmitter 23, and an antenna 24. The uplink message generator 21 receives information required for generating messages (layer 3 messages) to notify the base station apparatus according to the instruction from the upper layer at an appropriate timing. For example, it receives originated call request information for a originated call request message, originated call completion information for a originated call procedure completion message, wireless connection request information for a wireless connection request message, and wireless connection completion information for a wireless connection completion message, respectively. The uplink message generator 21 generates each message according to the received information and outputs it to the transmission signal processor 22.

The transmission signal processor 22 performs an appropriate scheduling for a message from the uplink message generator 21 and other transmission signals. The other transmission signals include uplink user traffic data, uplink control data, uplink reference signals, or the like. The data output from the transmission signal processor 22 based on the scheduling is output by the transmitter 23 as a transmission signal via an antenna according to transmission control information. The transmission control information includes information about transmission timing with regard to each channel, multiplexing method, resource allocation information, modulation, or the like.

Since components of other mobile station apparatuses in FIGS. 1 and 2 are irrelevant to the present embodiment, description thereof is omitted.

Figure 3:
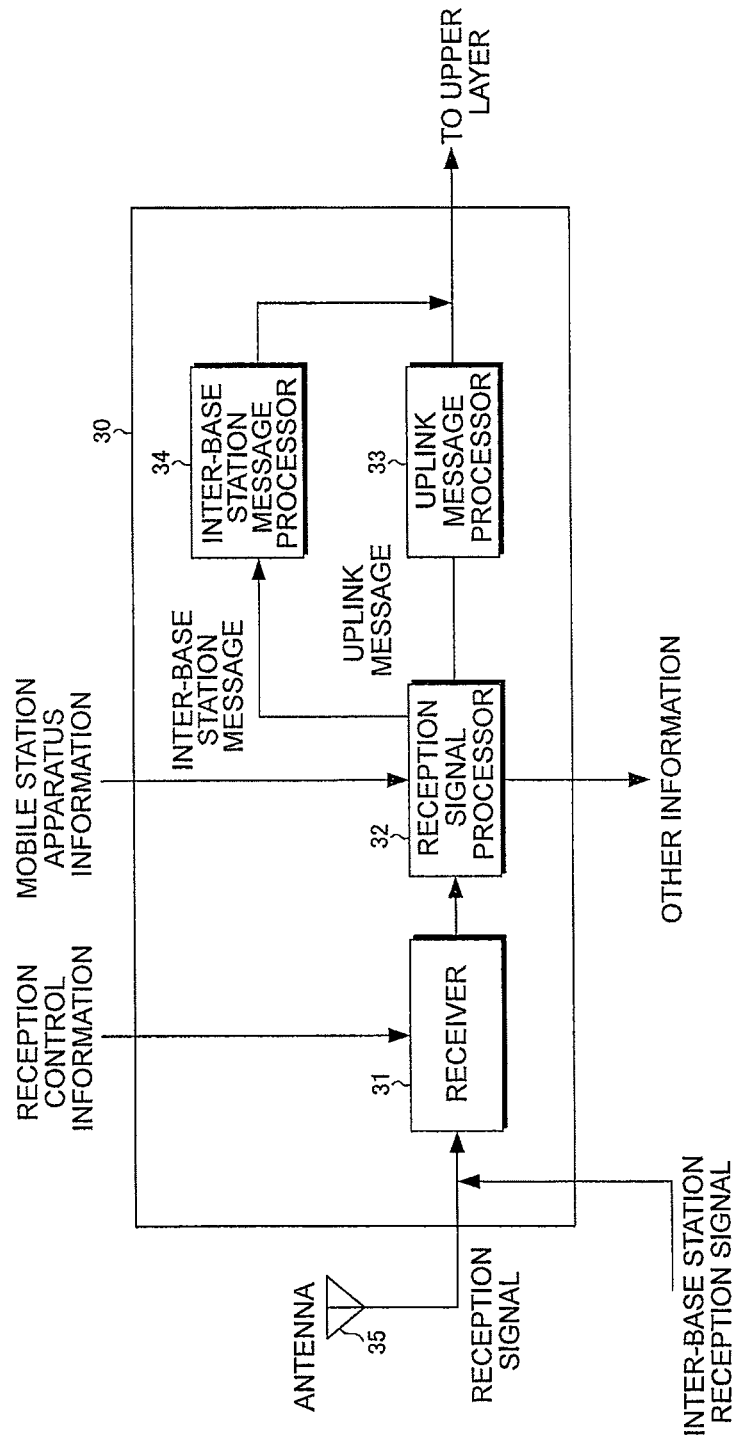
FIG. 3 is a block diagram showing a general configuration of a reception unit of a base station apparatus according to the first embodiment of the present invention.

FIG. 3 is a block diagram showing a general configuration of a reception unit of the base station apparatus according to the first embodiment of the present invention. A reception unit 30 comprises a receiver 31, a reception signal processor 32, an uplink message processor 33, an inter-base-station message processor 34, and an antenna 35. The reception signal (transmission signal from a mobile station apparatus) is received by the receiver 31 via the antenna 35. In addition, the inter-base-station reception signal (transmission signal from another base station apparatus) is transmitted from a nearby base station apparatus periodically, or as an event, using a wired line such as a dedicated line, and is received by the receiver 31.

In the receiver 31, the reception signal is demodulated based on reception control information indicating the channel schedule. The reception control information includes information about reception timing, multiplexing method, resource allocation information and demodulation, with regard to each channel for each mobile station apparatus. It also includes information about demodulation of the inter-base station reception signal. The receiver 31 demodulates and decodes the reception signal for each channel according to the reception control information and outputs it to the reception signal processor 32. In addition, the reception signal processor 32 receives mobile station apparatus information. The mobile station apparatus information includes mobile station apparatus access class information. Similarly, the inter-base-station reception signal is appropriately demodulated and decoded in the receiver 31 and output to the reception signal processor 32.

The reception signal processor 32 divides the received signal for each mobile station apparatus and appropriately processes the divided signals for each channel. If the received signal is an uplink message from the mobile station apparatus, it is output to the uplink message processor 33. If it is an inter-base-station message, it is output to the inter-base-station message processor 34. Although signals other than the uplink message and the inter-base-station message processed in the reception signal processor 32, for example, user traffic data, uplink control data, and other control messages are input as other information to individual processing blocks, they are irrelevant to the present invention and description thereof is omitted.

The uplink message processor 33 acquires a control parameter included in each uplink message and outputs it to the upper layer. The inter-base-station message processor 34 acquires a base station control parameter included in each inter-base-station message and outputs it to the upper layer.

Figure 4:
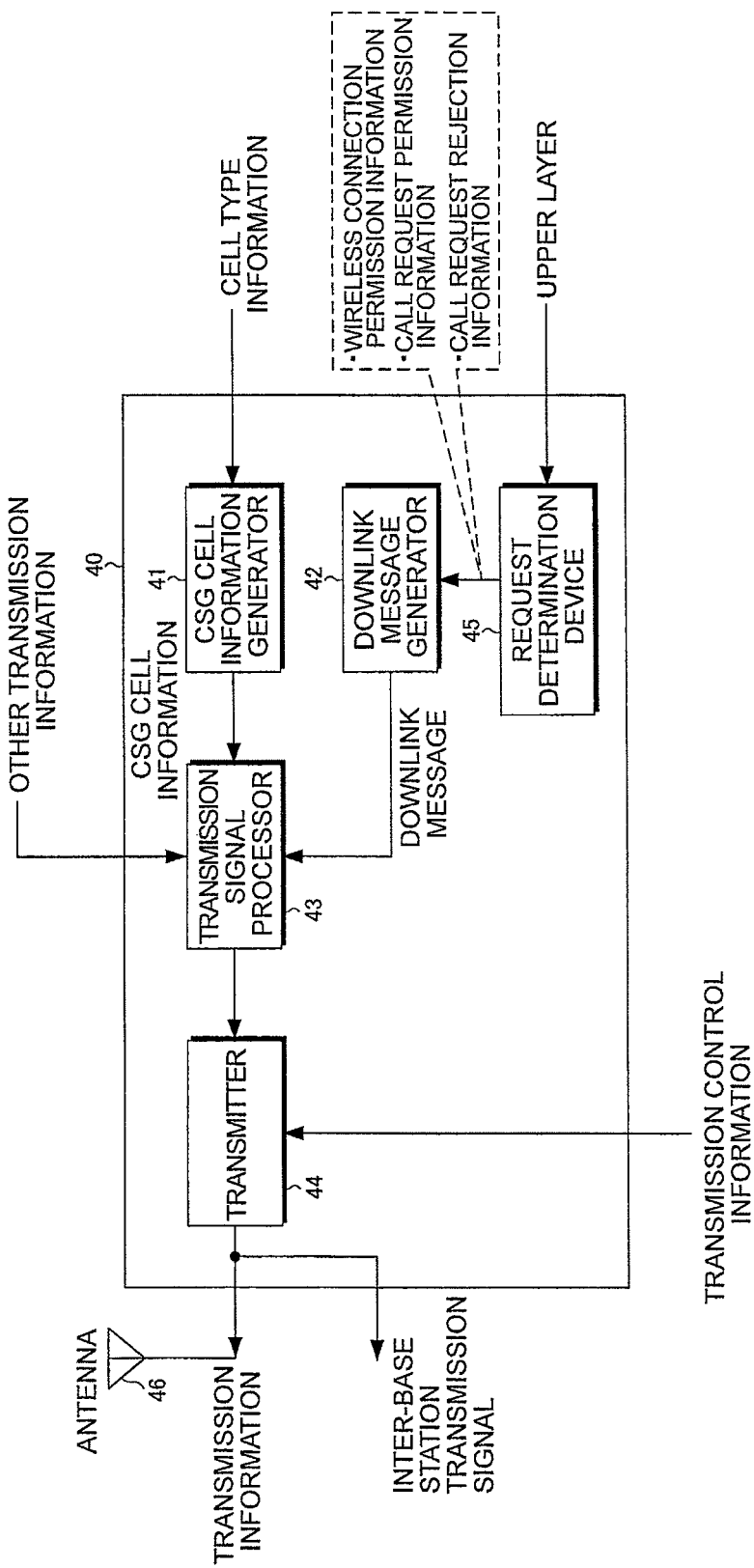
FIG. 4 is a block diagram showing a general configuration of a transmission unit of the base station apparatus according to the first embodiment of the present invention.

FIG. 4 is a block diagram showing a general configuration of a transmission unit of the base station apparatus according to the first embodiment of the present invention. A transmission unit 40 comprises a CSG cell information generator 41, a downlink message generator 42, a transmission signal processor 43, a transmitter 44, a request determination device 45, and an antenna 46. The CSG cell information generator 41 receives cell type information. The cell type information is information for determining whether the base station apparatus is a CSG cell or a macro cell. If the cell type information indicates that the base station apparatus is a CSG cell, the CSG cell information generator generates CSG cell information and outputs it to the transmission signal processor 43. If it does not indicate a CSG cell (in case of a macro cell), nothing is done.

Here, the CSG cell information may be any information as long as it enables the mobile station apparatus to determine that the base station apparatus is a CSG cell, and the content of the information may be arbitrary. For example, it may be cell ID information for generating a synchronization signal, CSG cell identifier information to be included in the broadcast information, or information of transmission frequency band.

The downlink message generator 42 generates a message (layer three message) which notifies the mobile station apparatus at an appropriate timing according to the instruction from the request determination device 45. For example, the downlink message generator 42 receives originated call request permission information fora originated call request permission message from the request determination device 45, originated call request rejection information for a originated call request rejection message, and wireless connection request information for a wireless connection request permission message, respectively. The downlink message generator 42 generates each message according to the received information and outputs it to the transmission signal processor 43. The transmission signal processor 43 receives CSG cell information and a downlink message. The transmission signal processor 43 performs appropriate scheduling for a transmission signal generated based on the CSG cell information from the CSG cell information generator 41 and other transmission signals. The other transmission signals include downlink user traffic data and downlink control data of each mobile station apparatus, downlink reference signals, or the like.

The data output from the transmission signal processor 43 based on the scheduling is output as a transmission signal by the transmitter 44 via the antenna 46 according to the transmission control information, if it is directed to the mobile station apparatus. If it is directed to the base station apparatus, it is output as an inter-base-station transmission signal by the transmitter 44 using a wired line such as a dedicated line according to transmission control information. The transmission control information includes information about transmission timing, multiplexing method, resource allocation information and modulation, with regard to each channel.

The request determination device 45 performs determination on the wireless connection request or the originated call request from the mobile station apparatus according to the instruction from the upper layer and, as a result of determination, outputs wireless connection request permission information, originated call request permission information, or originated call request rejection information to the downlink message generator 42.

Since components of other mobile station apparatuses in FIGS. 3 and 4 are irrelevant to the present embodiment, description thereof is omitted.

FIGS. 5 to 9 are sequence charts showing an initial access procedure and a originated call procedure of the mobile station apparatus Non-CSG_UE of the present invention. This sequence is suitable when registered CSG cell information is not stored in the mobile station apparatus (for example, when no SIM card is inserted), when the mobile station apparatus does not support a CSG cell, or when the mobile station apparatus selected an unregistered CSG cell as the cell to camp on. In addition, the macro cell in the drawings is a macro cell which is closest to the CSG cell. The macro cell closest to the CSG cell indicates the cell having the highest quality selected as a result of measurement when the mobile station apparatus or the CSG cell measured neighboring cells, and is a macro cell covering the cell radius of the CSG cell, for example. This information may be registered only once when the CSG cell is powered on, or the content of registration may be changed at a regular interval based on the measurement result.

Figure 5:
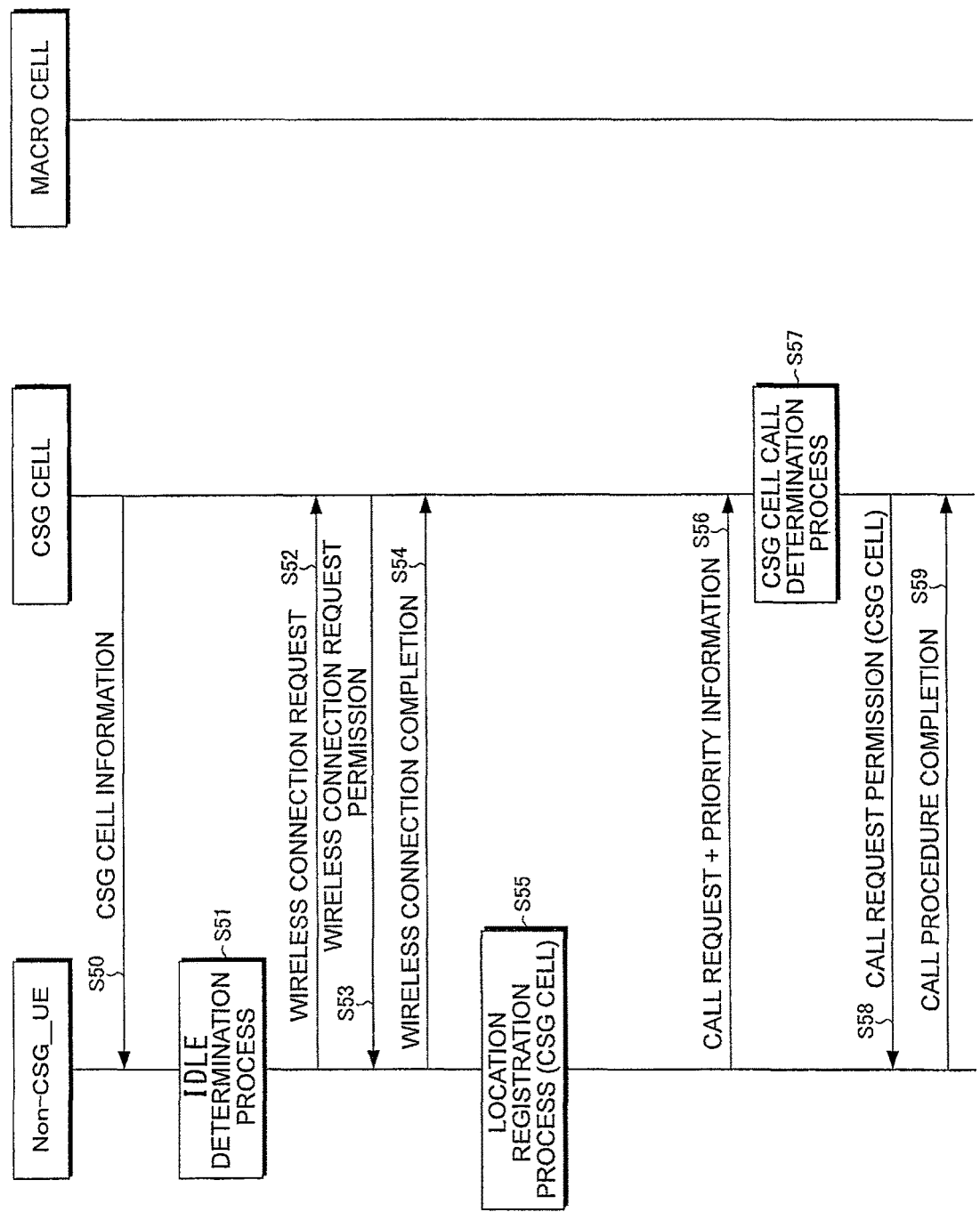
FIG. 5 is a sequence chart showing an initial access procedure and a originated call procedure of a mobile station apparatus Non-CSG_UE of the present invention.

In FIG. 5, the mobile station apparatus receives a synchronization signal, a downlink reference signal and broadcast information from the CSG cell and the macro cell, and acquires CSG cell information from the CSG cell (step S50). Although it is described for simplicity in FIG. 5 that the CSG cell information is transmitted from the CSG cell, a message bearing the CSG cell information is not actually transmitted but information is transmitted from the CSG cell so that the mobile station apparatus can distinguish a macro cell from a CSG cell by physical or control signaling, where the content of the information and the physical channel employed may be arbitrary. For example, it may be cell ID information notified by the synchronization signal, CSG cell identifier information included in the broadcast information notified by the broadcast channel, or information of the frequency band of the detected synchronization signal. The mobile station apparatus determines, from the CSG cell information, whether the cell is a CSG cell or a macro cell.

Subsequently, the mobile station apparatus performs a idle determination process (step S51) and selects the cell with the highest reception quality (best cell) of the downlink reference signal from the base station apparatus. Here, the mobile station apparatus starts a random access procedure (not shown) even if the selected cell is an unregistered CSG cell and transmits a wireless connection request message to the unregistered CSG cell (step S52). The mobile station apparatus transmits a wireless connection request message having included therein at least a user identifier (random bit string or IMSI (International Mobile Subscriber Identifier), i.e., a number specific to the mobile station apparatus). If the CSG cell which received the wireless connection request message determines to permit wireless connection of the mobile station apparatus, it transmits a originated call procedure completion message having included therein the required radio control information to the mobile station apparatus (step S53). The mobile station apparatus which received the wireless connection request permission message transmits a wireless connection completion message to the CSG cell (step S54).

The mobile station apparatus subsequently performs a location registration process on the network via the CSG cell (step S55) in order to notify that the mobile station apparatus camps on the CSG cell. The network stores the user identifier of the mobile station apparatus in the location registration process, assigns a temporary user identifier (S-TMSI: System architecture evolution-Temporary Mobile Subscriber Identifier, or the like) corresponding to the user identifier on a one-to-one basis, and notifies the mobile station apparatus of the temporary user identifier (user identification information).

Furthermore, when the mobile station apparatus camping on a CSG cell receives a originated call request for a priority call from the upper layer and performs a originated call process (priority call), it transmits, to the CSG cell, a originated call request message having included therein at least priority information indicating that the call is a priority call and a temporary user identifier (user identification information) (step S56). The CSG cell checks the content of the priority information at the CSG cell originated call determination process (step S57) and, if the type of call requested by the mobile station apparatus is a priority call, permits the originated call request to the CSG cell and transmits, to the mobile station apparatus, a originated call request permission message to the CSG cell (step S58). The mobile station apparatus which received the originated call request permission message transmits a originated call procedure completion message to the CSG cell (step S59) and starts transmission of actual data thereafter. In FIG. 5, description of other channels transmitted from the CSG cell and the macro cell is omitted.

Figure 6:
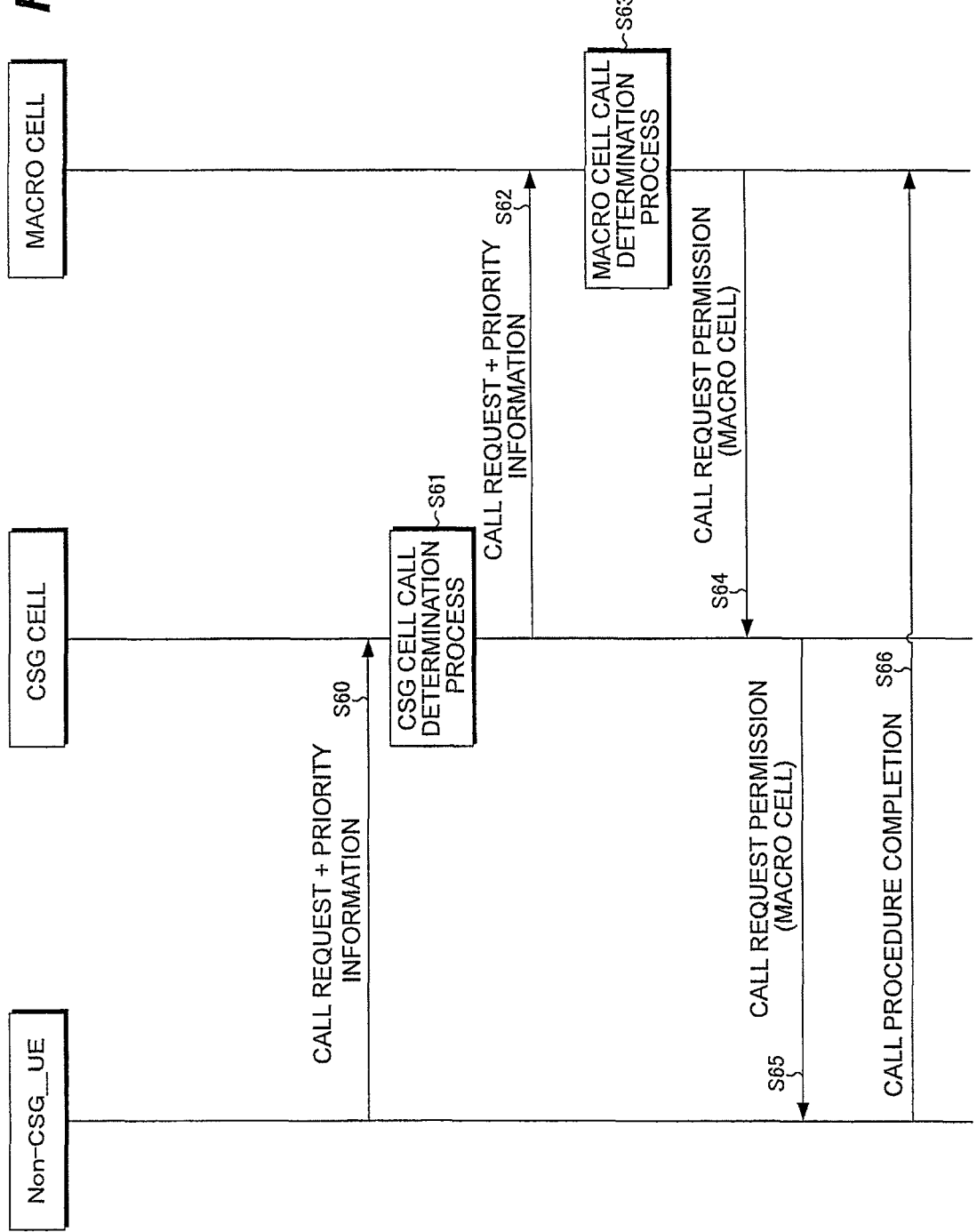
FIG. 6 is a sequence chart showing another initial access procedure and another originated call procedure according to the mobile station apparatus Non-CSG_UE of the present invention.

FIG. 6 is a sequence chart showing an initial access procedure and a originated call procedure of the mobile station apparatus Non-CSG_UE of the present invention. The sequence until selecting an unregistered CSG cell by the idle determination process and camping on the CSG cell is identical to that of FIG. 5. When the mobile station apparatus camping on the CSG cell receives a originated call request for a normal call from the upper layer and performs a originated call process (normal call), it transmits a originated call request message having included therein at least priority information indicating that the call is a normal call and a temporary user identifier (user identification information) to the CSG cell (step S60). The CSG cell checks the content of the priority information in the CSG cell originated call determination process (step S61) and, if the type of call requested by the mobile station apparatus is a normal call, transfers the originated call request message to the CSG cell to a closest macro cell (step S62).

The macro cell to which the originated call request message has been transferred determines whether the mobile station apparatus can make a originated call to the macro cell (step S63) and, if a originated call can be made, transmits a originated call request permission message to a CSG cell in response to the transferred originated call request message (step S64). The originated call request permission message is transferred from the CSG cell to the mobile station apparatus (step S65), and the mobile station apparatus acquires, if necessary, broadcast information from the broadcast channel of the macro cell, transmits a originated call procedure completion message to the macro cell after a random access procedure (not shown) (step S66), and starts transmission of actual data thereafter. In this occasion, the originated call request permission message may include the content of the broadcast information of the macro cell and preamble information for use in the random access procedure. In FIG. 6, description of other channels transmitted from the CSG cell and the macro cell is omitted.

In the CSG cell of FIGS. 5 and 6, whether or not to perform transfer may be determined, not by transferring the originated call request message based on the priority information for each type of call, but according to the radio resource usage status of the CSG cell. For example, a originated call to the CSG cell may be permitted if an amount of the radio resource of the CSG cell is unused not less than a predetermined threshold value, or the originated call request message may be transferred to the closest macro cell if only an amount of radio resource less than a predetermined threshold is left, and it may be determined whether or not a originated call can be made in the macro cell.

Figure 7:
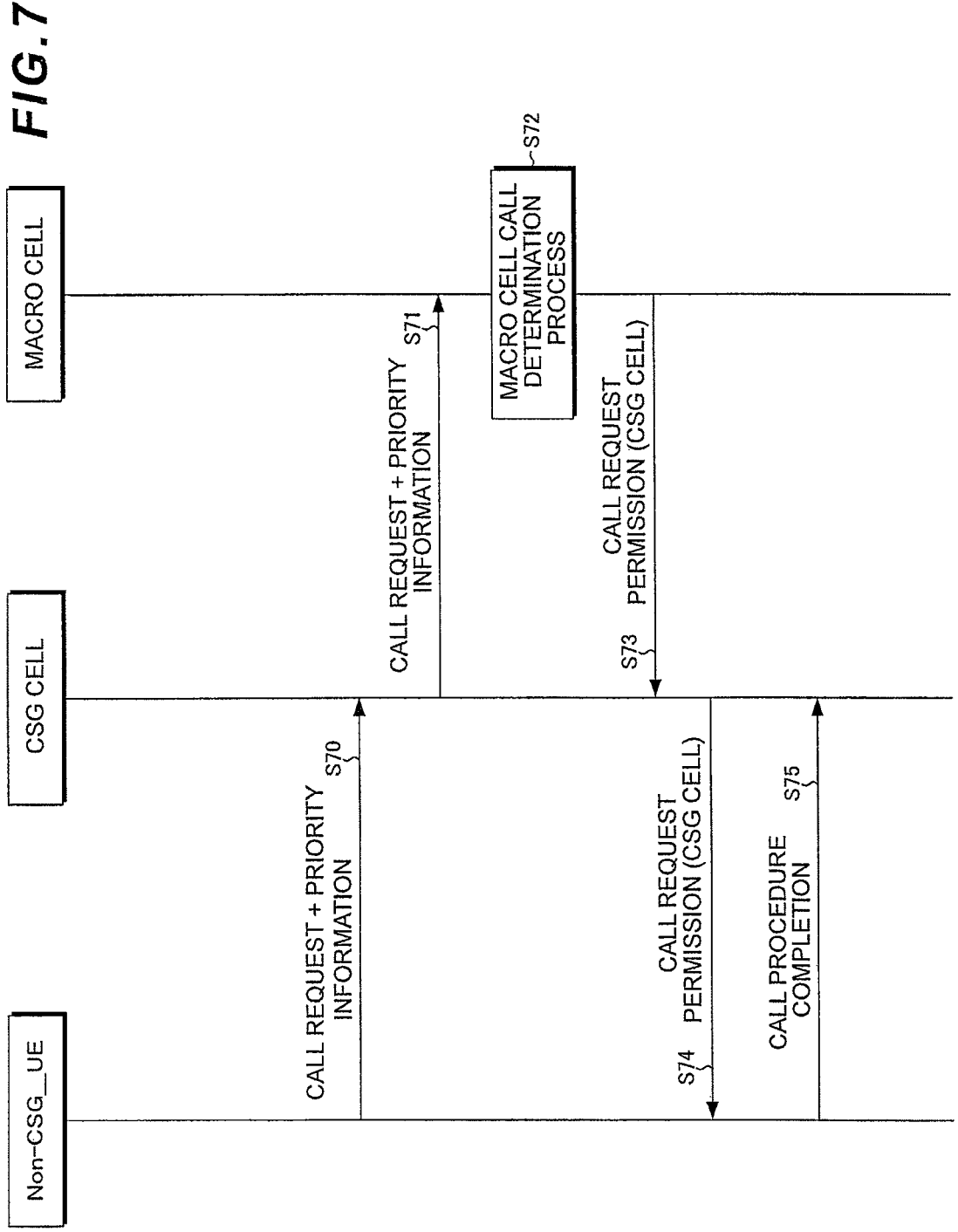
FIG. 7 is a sequence chart showing another initial access procedure and another originated call procedure according to the mobile station apparatus Non-CSG_UE of the present invention.

FIG. 7 is a sequence chart showing an initial access procedure and a originated call procedure of the mobile station apparatus Non-CSG_UE of the present invention. The sequence until selecting an unregistered CSG cell by the idle determination process and camping on the CSG cell is identical to that of FIG. 5. When the mobile station apparatus camping on the CSG cell receives a originated call request for a priority call from the upper layer and performs a originated call process (priority call), it transmits a originated call request message having included therein at least priority information indicating that the call is a priority call and a temporary user identifier (user identification information) to the CSG cell (step S70). The CSG cell transfers the originated call request message to the closest macro cell (step S71). The macro cell to which the originated call request message has been transferred receives the transferred originated call request, checks the content of the priority information in the macro cell originated call determination process (step S72) and, if the type of call requested by the mobile station apparatus is a priority call, permits the originated call request to the CSG cell, and transfers the originated call request permission message to the CSG cell to the CSG cell (step S73). The CSG cell transfers the originated call request permission message to the mobile station apparatus (step S74), and the mobile station apparatus which received the originated call request permission message transmits a originated call procedure completion message to the CSG cell (step S75), and starts transmission of actual data thereafter. In FIG. 7, description of other channels transmitted from the CSG cell and the macro cell is omitted.

Figure 8:
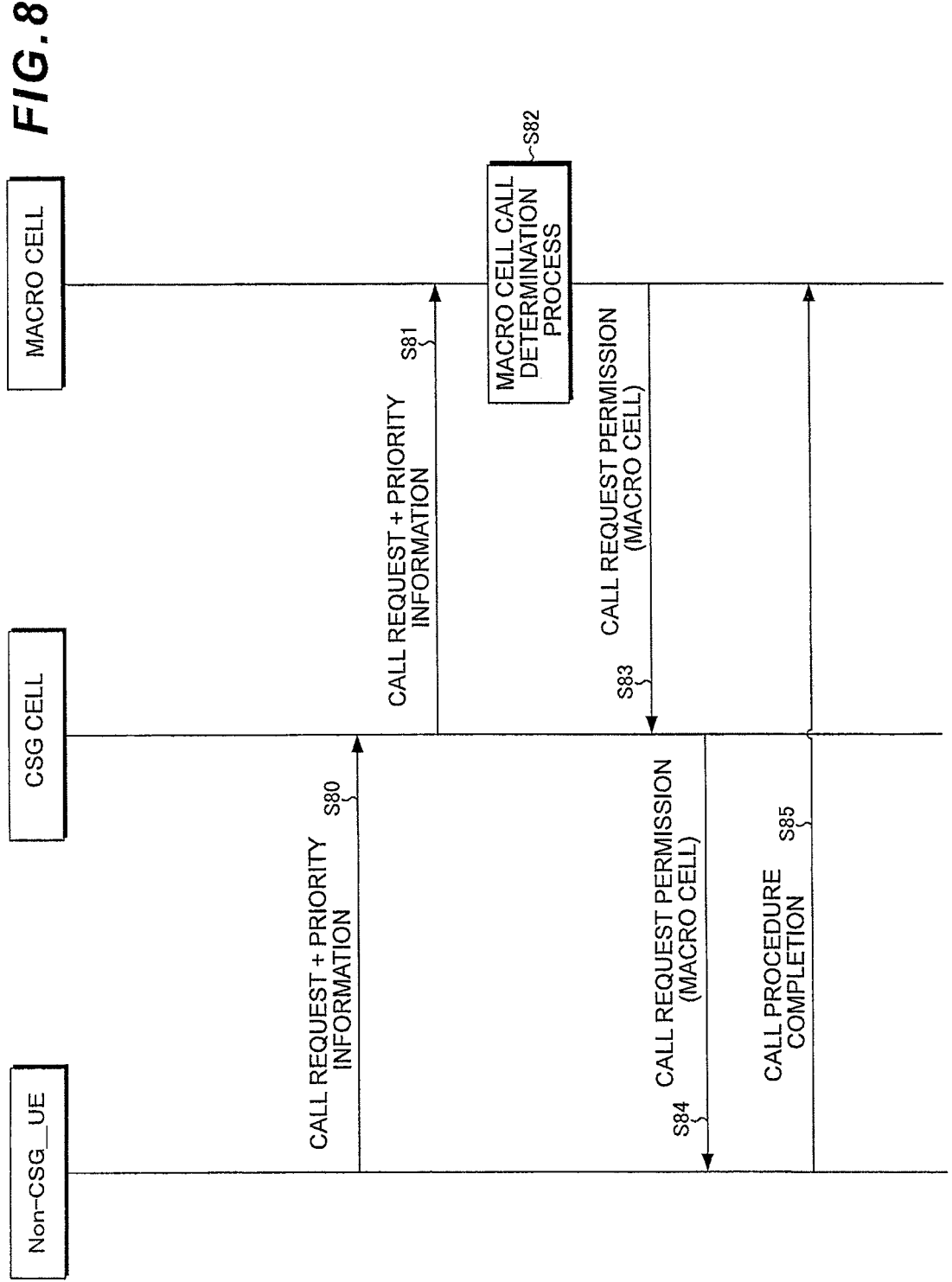
FIG. 8 is a sequence chart showing another initial access procedure and another originated call procedure according to the mobile station apparatus Non-CSG_UE of the present invention.

FIG. 8 is a sequence chart showing an initial access procedure and a originated call procedure of the mobile station apparatus Non-CSG_UE of the present invention. The sequence until selecting an unregistered CSG cell by the idle determination process and camping on the CSG cell is identical to that of FIG. 5. When the mobile station apparatus camping on the CSG cell receives a originated call request for a normal call from the upper layer and performs a originated call process (normal call), it transmits a originated call request message having included therein at least priority information indicating that the call is a normal call and a temporary user identifier (user identification information) to the CSG cell (step S80). The CSG cell transfers the originated call request message to the closest macro cell (step S81). The macro cell receives the transferred originated call request, checks the content of the priority information in the macro cell originated call determination process (step S82) and, if the type of call requested by the mobile station apparatus is a normal call, determines to make a originated call in the macro cell without permitting the originated call request to the CSG cell, and transmits, to the CSG cell, a originated call request permission message to the macro cell (step S83). The CSG cell transfers the originated call request permission message to the mobile station apparatus (step S84), and the mobile station apparatus which received the originated call request permission message acquires, if necessary, broadcast information from the broadcast channel of the macro cell, transmits a originated call procedure completion message to the macro cell after a random access procedure (not shown) (step S85), and starts transmission of actual data thereafter. In this occasion, the originated call request permission message may include the content of the broadcast information of the macro cell and preamble for use in the random access procedure. In FIG. 8, description of other channels transmitted from the CSG cell and the macro cell is omitted.

Figure 9:
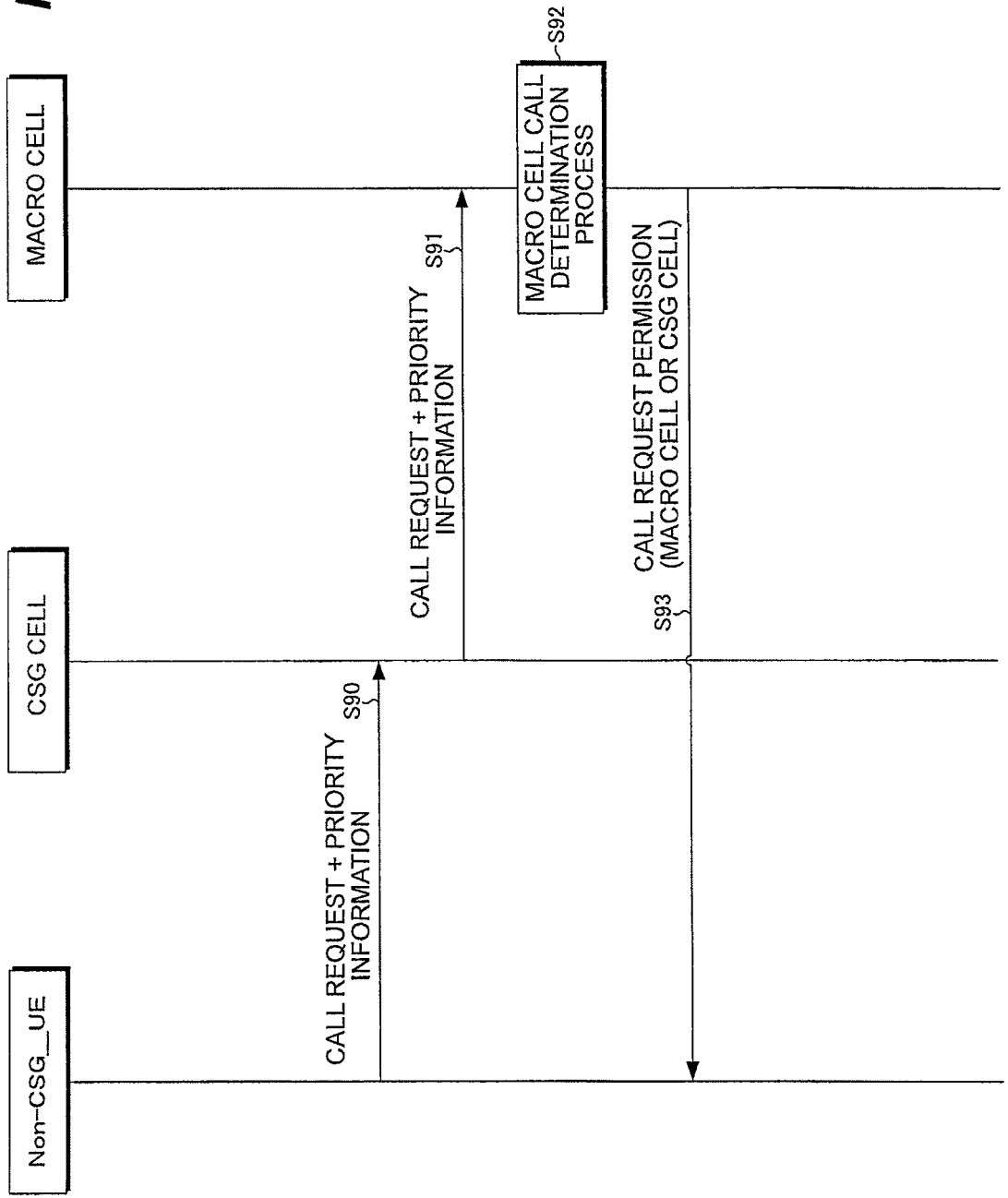
FIG. 9 is a sequence chart showing another initial access procedure and another originated call procedure according to the mobile station apparatus Non-CSG_UE of the present invention.

In FIGS. 7 and 8, the originated call request permission message may be directly transmitted to the mobile station apparatus from the macro cell (step S93) after performing the processes up to the macro cell originated call determination process (steps S90 to S92) as shown in FIG. 9. In this case, information such as the user identifier (user identification information) required for downlink reception control of the mobile station apparatus stored in the CSG cell is transferred from the CSG cell to the macro cell, in order to notify the mobile station apparatus of the message directly from the macro cell.

Figure 10:
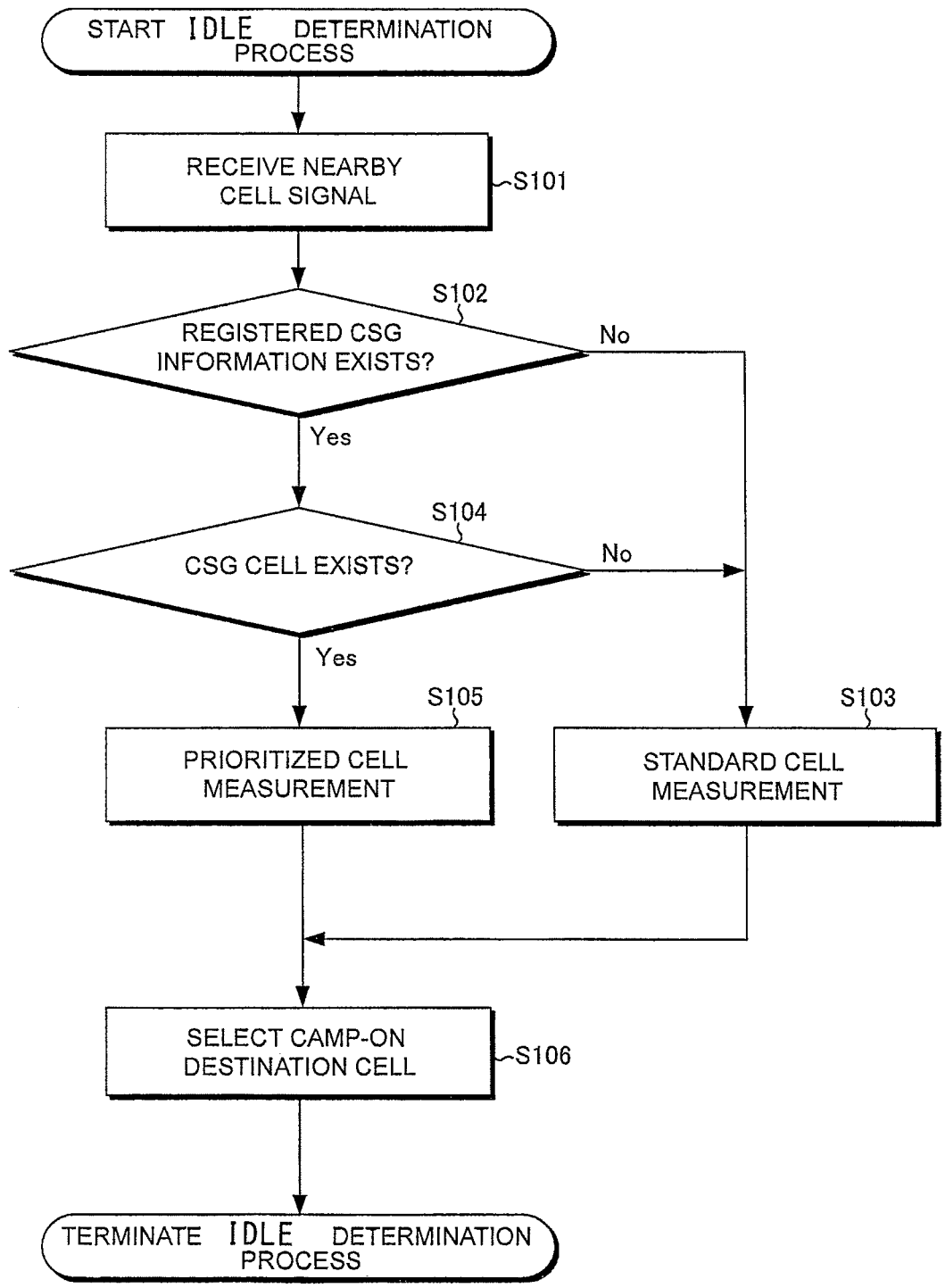
FIG. 10 is a flow chart showing a procedure of a idle determination process of the mobile station apparatus in FIG. 5.

FIG. 10 is a flow chart showing a procedure of the idle determination process of the mobile station apparatus in FIG. 5. In the neighboring cell signal reception of FIG. 10, the mobile station apparatus receives signals from neighboring cells without distinguishing a CSG cell from a macro cell, and selects one or more neighboring cells satisfying the reception quality suitable for camping (step S101). Next, it is checked whether or not registered CSG information is stored in the mobile station apparatus (step S102). If no registered CSG cell information is stored, that is, a SIM card having registered CSG cell information stored therein is not inserted or the mobile station apparatus does not support a CSG cell, the standard cell measurement is performed as neighboring cell measurement (step S103). If, on the other hand, registered CSG cell information is stored, it is determined based on the CSG cell information whether or not a CSG cell is placed among neighboring cells and a signal of the CSG cell is included in the reception signal (step S104). If a CSG cell is placed among neighboring cells, a prioritized cell measurement is performed (step S105). If the CSG cell is not placed among neighboring cells, the standard cell measurement is performed (step S103).

The prioritized cell measurement is a cell measurement control method that makes a registered CSG cell selectable with a higher priority than a macro cell or an unregistered CSG cell, and although there are methods such as adding a predetermined offset value to the reception quality of a registered CSG cell, or limiting measurement of cells other than the registered CSG cell, any method other than those described above can be used provided that it makes the reception quality of the registered CSG cell better than the result of the normal cell measurement. If there are only macro cells and unregistered CSG cells in the periphery, an offset value may be added so that a macro cell is made selectable with a higher priority. On the other hand, the standard cell measurement is measurement method that does not perform an additional control such as adding an offset value to the reception quality depending on whether or not the cell is a CSG cell. In a camp-on destination cell selection process, the best camp-on destination cell is selected from the measurement result of neighboring cells acquired by any of the measurements (step S106).

The flow chart shown in FIG. 10 is an exemplary procedure of the mobile station apparatus, and any procedure other than this may be used provided that the mobile station apparatus determines switching of measurement processes according to the registered CSG cell information and environment of neighboring cells (presence of a CSG cell) and selects the best cell for idle based on the determination. In addition, when a cell which is not appropriate for camping has been preliminarily notified as a neighboring cell from the base station apparatus by broadcast information, the camp-on destination cell is not selected as the best cell.

Figure 11:
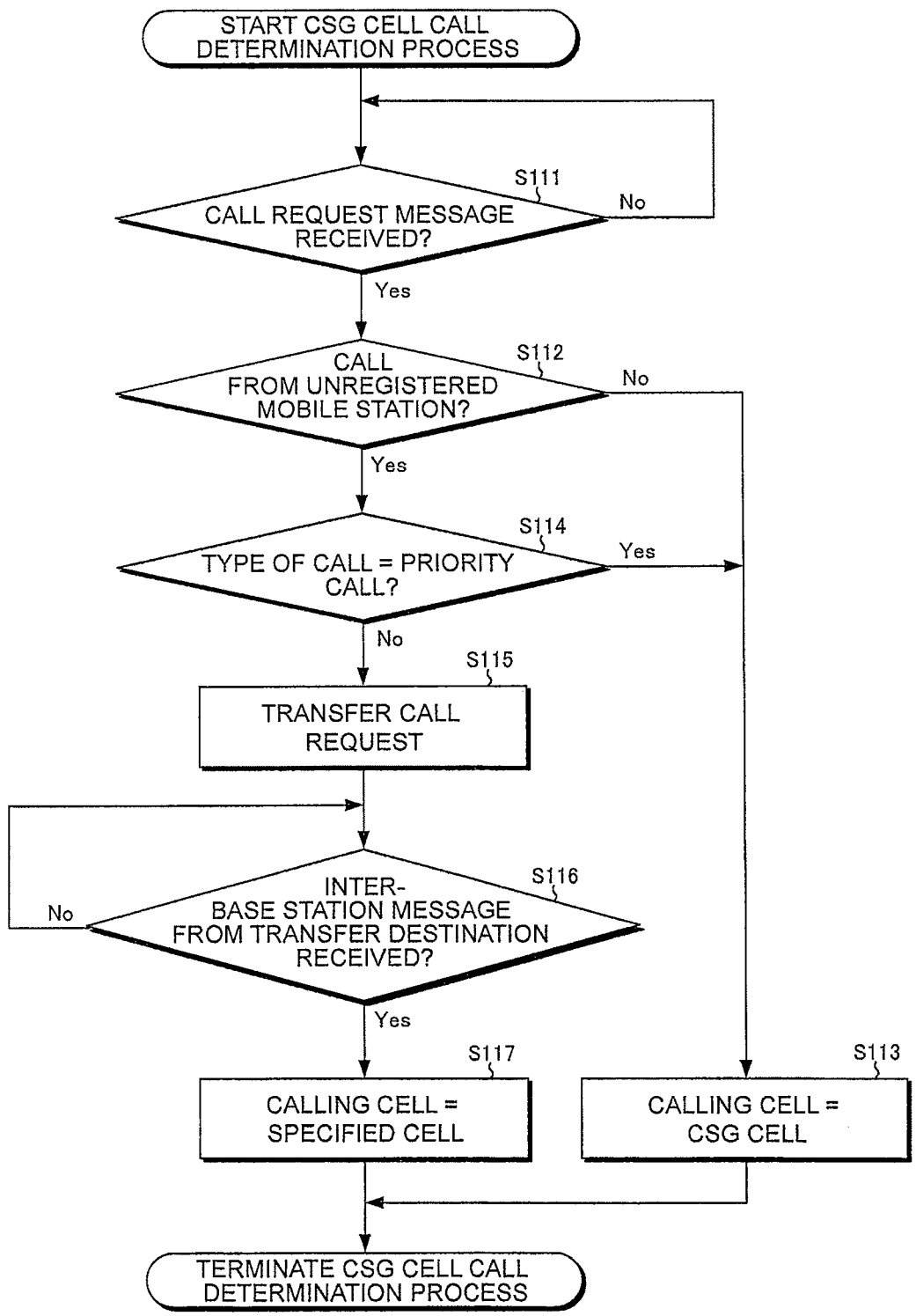
FIG. 11 is a flow chart showing a procedure of a CSG cell originated call determination process of the base station apparatus which is a CSG cell in FIGS. 5 and 6.

FIG. 11 is a flow chart showing a procedure of the CSG cell originated call determination process of the base station apparatus which is the CSG cell in FIGS. 5 and 6. In FIG. 11, if the base station apparatus performs a originated call request message reception process determination after the random access procedure and the originated call request message is received (step S111), it determines whether or not the mobile station apparatus which transmitted the originated call request message is a registered mobile station apparatus (step S112). In this determination method, it is possible to determine according to whether or not a temporary user identifier (user identification information) assigned when requesting wireless connection is included in the originated call request message.

For a originated call from the mobile station apparatus registered in the CSG cell, it is determined that a originated call in the CSG cell is possible (step S113), and the process is terminated. For a originated call from an unregistered mobile station apparatus, on the other hand, the type of call is determined, based on the simultaneously notified priority information, whether the call is a priority call (step S114). Here, if the type of call is a priority call, it is determined that originated call in a CSG cell is possible (step S113) and the process is terminated. If, on the other hand, the type of call is a normal call, the originated call request message is transferred to the closest macro cell (step S115). The inter-base-station message from the macro cell to which the message is transferred is monitored (step S116), and when a originated call request permission message is received from the macro cell, the specified cell included in the message is determined to be a cell of the originated call destination (step S117), and the process is terminated.

The flow chart shown in FIG. 11 is an exemplary procedure of the base station apparatus which is a CSG cell, and any procedure other than this may be used provided that the base station apparatus can determine whether or not it is possible to make a originated call according to determination of whether or not the mobile station apparatus which made the originated call in the CSG cell is the registered mobile station apparatus and the content of the priority information. In addition, although a case is omitted where the originated call request is rejected by the closest macro cell to which the originated call request has been transferred, it suffices in this case to notify a originated call request rejection message instead of a originated call request permission message.

Figure 12:
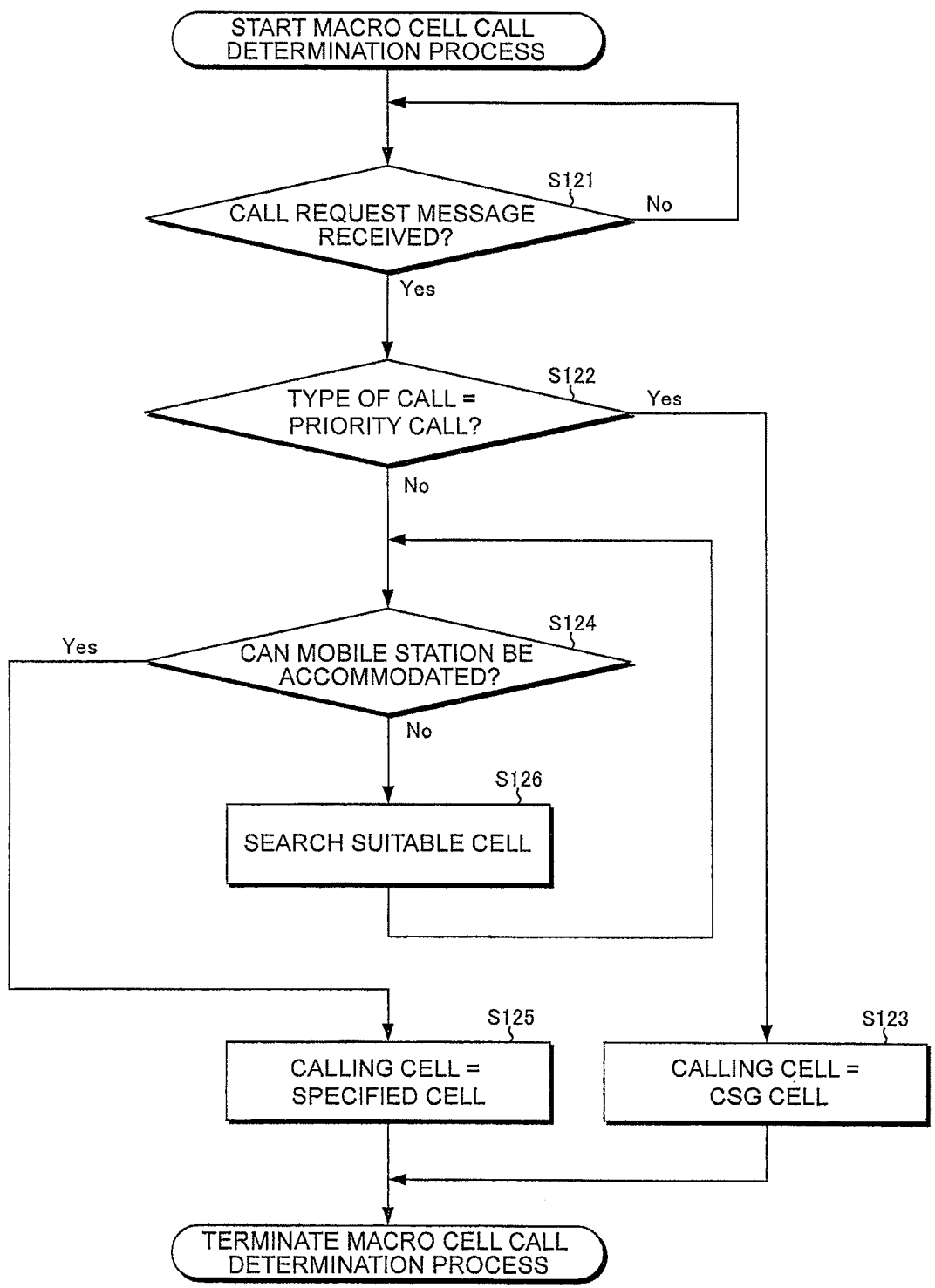
FIG. 12 is a flow chart showing a procedure of a CSG cell originated call determination process of the base station apparatus which is a macro cell in FIGS. 6 to 9.

FIG. 12 is a flow chart showing a procedure of the CSG cell originated call determination process of the base station apparatus which is the macro cell in FIGS. 6 to 9. In FIG. 12, the base station apparatus performs originated call request message reception process determination by monitoring the inter-base-station messages (step S121) and, if a originated call request message is transferred, determines the type of call, i.e., whether or not the call is a priority call based on the simultaneously transferred priority information (step S122). Here, if the type of call is a priority call, it is determined that a originated call in the CSG cell is possible (step S123), and the process is terminated. If, on the other hand, the type of call is a normal call, it is determined whether or not the mobile station apparatus can be accommodated based on the number of mobile station apparatuses communicating in the macro cell, the amount of traffic and the radio resource usage status (step S124), and, if accommodation is possible, the macro cell is defined as the originated call destination cell (step S125), and the process is terminated. If, on the other hand, it is determined that the accommodation is impossible, a neighboring cell that can communicate with the mobile station apparatus is searched (step S126), and it is determined again whether or not accommodation is possible. The process is repeated until a cell which can accommodate the mobile station apparatus is detected and once a cell which can accommodate the mobile station is detected, the detected cell is defined as the originated call destination cell and the process is terminated.

The flow chart of FIG. 12 is an exemplary procedure of the base station apparatus which is a macro cell, and procedure other than this may be used provided that the base station apparatus can determine whether or not it is possible to make a originated call according to the content of the priority information notified by the mobile station apparatus which made the originated call in the macro cell and the determination of whether or not the mobile station apparatus can be accommodated. In addition, although a case is omitted where the originated call request is rejected because a cell that can accommodate mobile station apparatus was not found, it suffices in this case to notify a originated call request rejection message instead of a originated call request permission message. It is also possible to include all or a part of a process similar to that of FIG. 12, not in a macro cell, but in a management device belonging to an upper-layer network such as, for example, MME (Mobility Management Entity), S-GW (Serving Gateway), or the like. In this case, related messages may be exchanged between the CSG cell and the management device, or messages may be exchanged between the macro cell and the management device.

Additionally, it suffices that the information notified from the mobile station apparatus as priority information is information including several bits which can at least distinguish a normal call from a priority call, and other information such as the reason of making a originated call may be included.

Although a procedure when an unregistered mobile station apparatus accesses a CSG cell has been described in the foregoing, it is undesirable for the original registrant that an unregistered mobile station apparatus and a mobile station apparatus registered as a subscriber are both accessible to a CSG cell under exactly the same condition. Therefore, it is preferable that an access restriction which is different from the registered CSG cell is applied when the mobile station apparatus accesses an unregistered CSG cell based on the type of call and the type of cell. Access restriction refers to a control of temporarily restricting the number of mobile station apparatuses that access a cell in order to distribute network load and secure radio resources.

Figure 13:
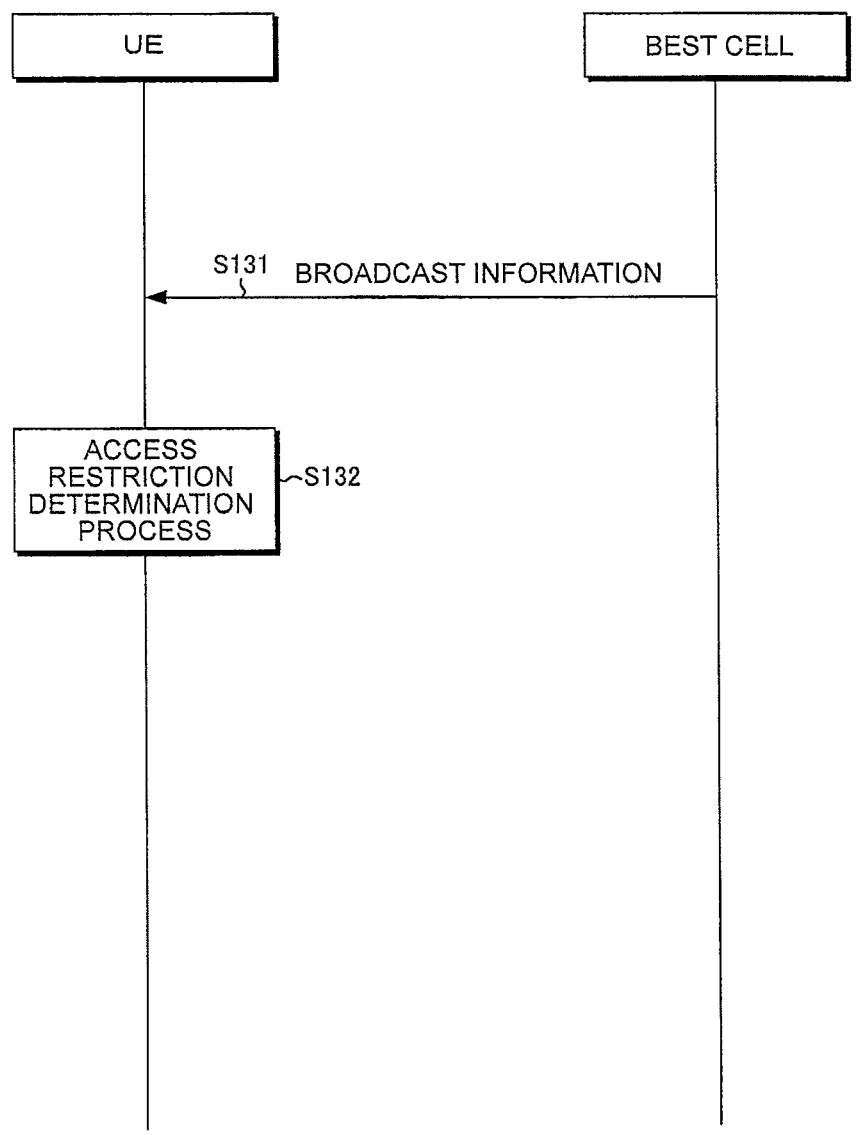
FIG. 13 is a sequence chart when the mobile station apparatus UE performs access restriction based on the type of call and the type of cell.

FIG. 13 is a sequence chart when a mobile station apparatus UE performs an access restriction based on the type of call and the type of cell. FIG. 13 starts from the point when the mobile station apparatus selected the cell having the best reception quality based on the reception signal from a neighboring cell. Here, the mobile station apparatus UE receives a broadcast channel from the best cell (step S131). The broadcast channel includes three types of access restriction information required for subsequent access restriction determination process. The three types of access restriction information are: (1) for making a normal call, (2) for making a priority call to an unregistered CSG cell, and (3) for making a priority call to a registered CSG cell. The mobile station apparatus acquires and stores the access restriction information, and performs the access restriction determination process (step S132). In this determination process, access restriction information is applied according to the type of call and the type of cell. The access restriction information including at least an access restriction time and an access restriction threshold value is used with the purpose of determining a random value when making a originated call and stopping the uplink transmission process as long as the access restriction time, if the access restriction threshold value is larger than the random value. In addition, an access restriction time and the access restriction threshold may be used as apart of values for parameter calculation, without being used as-is.

Figure 14:
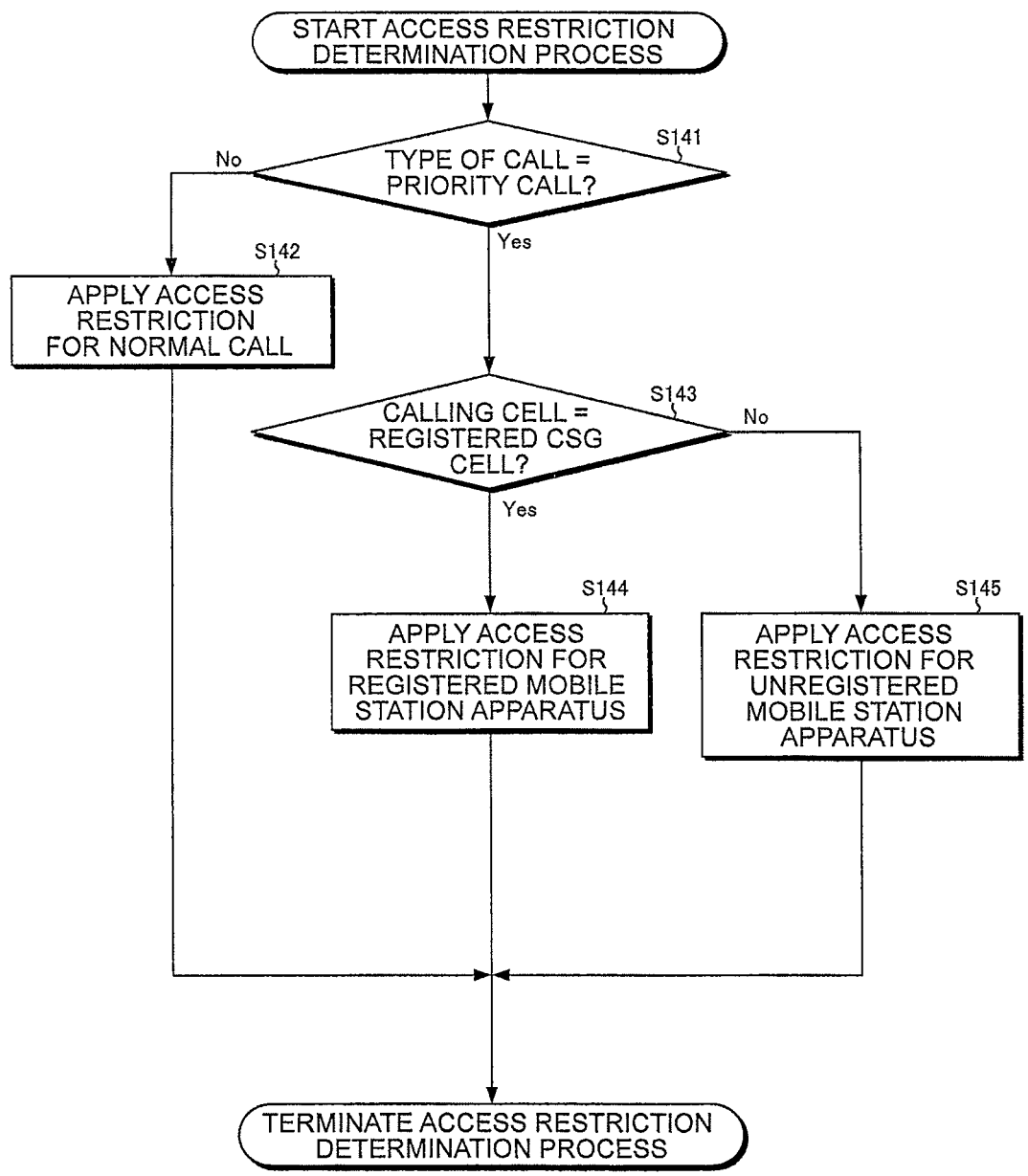
FIG. 14 is a flow chart showing an access restriction determination procedure of the mobile station apparatus.

FIG. 14 is a flow chart showing the access restriction determination procedure of the mobile station apparatus. The mobile station apparatus has acquired access restriction information from the broadcast information. When the mobile station apparatus starts uplink transmission in order to issue a wireless connection request or a originated call request to the best cell, it determines whether or not the type of call is a priority call (step S141). In the case of a normal originated call request or a wireless connection request, access restriction information for a normal call is usually applied (step S142). For a priority call, on the other hand, it is determined whether or not the calling cell is a registered CSG cell (step S143). If it is a registered CSG cell, access restriction information for a registered mobile station apparatus is applied (step S144). If, on the other hand, it is not a registered CSG cell, access restriction information for an unregistered mobile station apparatus is applied (step S145). Subsequently, it is determined whether or not to permit uplink transmission, based on any of the applied access restriction information.

Figure 15:
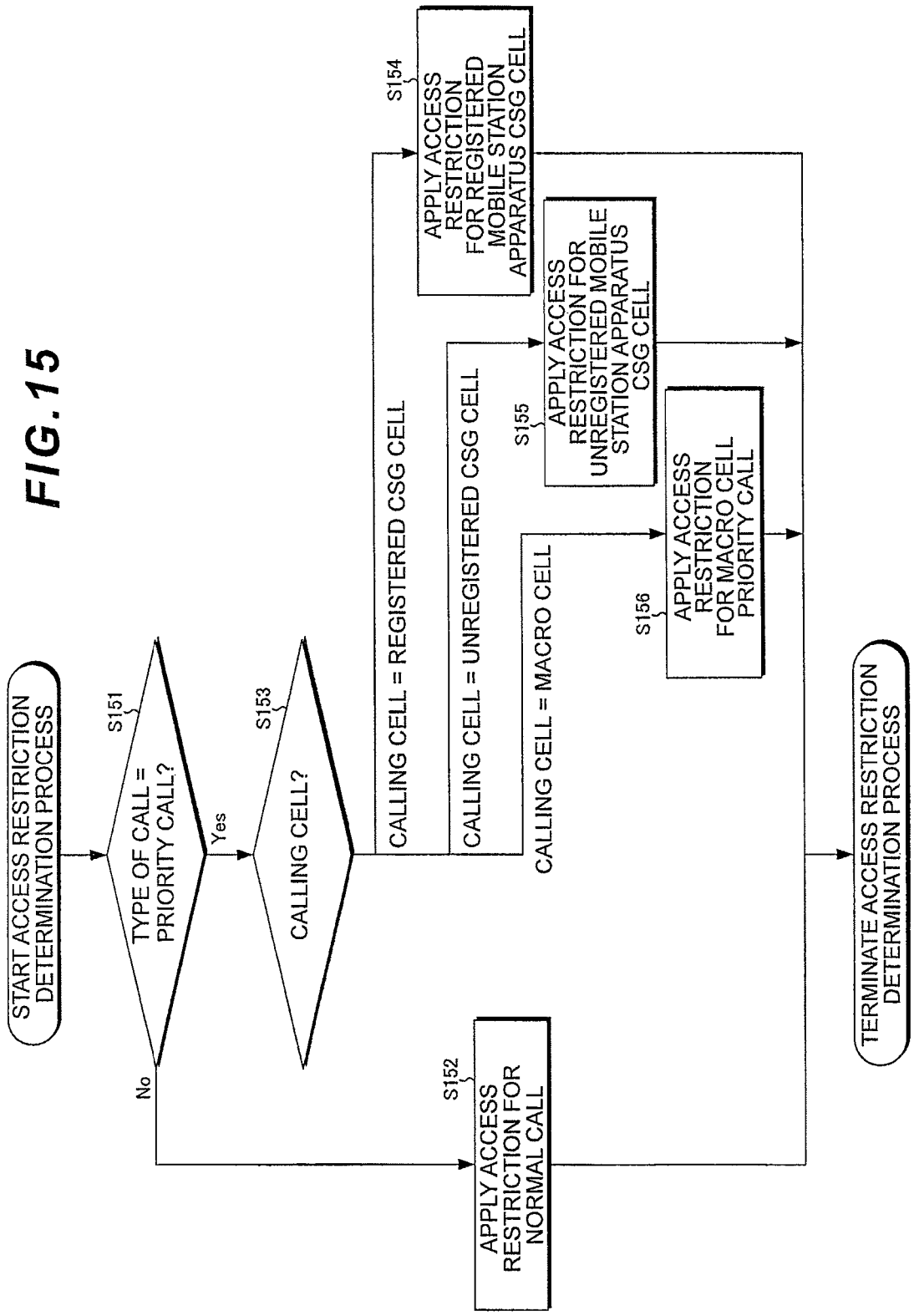
FIG. 15 is a flow chart showing another access restriction determination procedure of the mobile station apparatus.

FIG. 15 is a flow chart showing another access restriction determination procedure of the mobile station apparatus. In addition to the procedure of FIG. 14, it differs in that (4) access restriction information for making a priority call to the macro cell is prepared. In FIG. 15, the mobile station apparatus has acquired access restriction information from the broadcast information. When the mobile station apparatus starts uplink transmission in order to issue a wireless connection request or a originated call request to the best cell, it determines whether or not the type of call is a priority call (step S151). In the case of a normal originated call request or a wireless connection request, access restriction information for a normal call is usually applied (step S152).

For a priority call, on the other hand, the type of the calling cell is checked (step S153). If it is a registered CSG cell, access restriction information for a registered mobile station apparatus CSG cell is applied (step S154). If, on the other hand, it is not a registered CSG cell, access restriction information for an unregistered mobile station apparatus CSG cell is applied (step S155). Additionally, in the case of a macro cell, access restriction information for a macro cell priority call is applied (step S156). Subsequently, it is determined whether or not to permit uplink transmission, based on any of the applied access restriction information.

Although an exemplary case is shown where access restriction information is acquired from the broadcast information, the access restriction information may be uniquely defined in the system, and the mobile station apparatus may determine the access restriction which is applied based on the type of call and the type of the originated call destination cell. In addition, fixed access restriction information may be defined in the system, and the remaining variable access restriction information may be acquired from the broadcast information.

According to the present embodiment, the mobile station apparatus enters the idle mode in the most suitable cell regardless of existence or nonexistence of registered CSG cell information, or whether or not it is an unregistered CSG cell. Furthermore, also in a originated call procedure when communicating with a priority call, it transmits a originated call request message to the base station apparatus of a cell in idle mode, regardless of existence or nonexistence of registered CSG cell information, or whether or not it is an unregistered CSG cell. In addition, the base station apparatus receives a originated call request message from the mobile station apparatus and determines a cell that starts communication.

According to the present embodiment, it becomes possible for the mobile station apparatus to enter the idle mode in the most suitable cell regardless of existence or nonexistence of registered CSG cell information, or whether or not it is an unregistered CSG cell, whereby the reception quality improves. In addition, since the base station apparatus appropriately determines a cell to communicate with the mobile station apparatus even if there is no registered CSG information or even if a originated call is made in an unregistered CSG cell, the originated call success rate rises and the number of call interruptions can be reduced. Particularly, since it becomes possible to perform communication of a priority call in an appropriate cell, speech quality of a priority call improves.

Second Embodiment

Next, a second embodiment of the present invention will be described. With the mobile station apparatus of the first embodiment, the procedure is once terminated if the originated call request or the wireless connection request is rejected. In the present embodiment, a method is shown by which the mobile station apparatus can continue the procedure without terminating it by having the cell that issues the originated call request or the wireless connection request included in the rejection message. The reception unit and the transmission unit of the mobile station apparatus, and the reception unit and the transmission unit of the base station apparatus in the present embodiment may be identical to those in the first embodiment.

Figure 16:
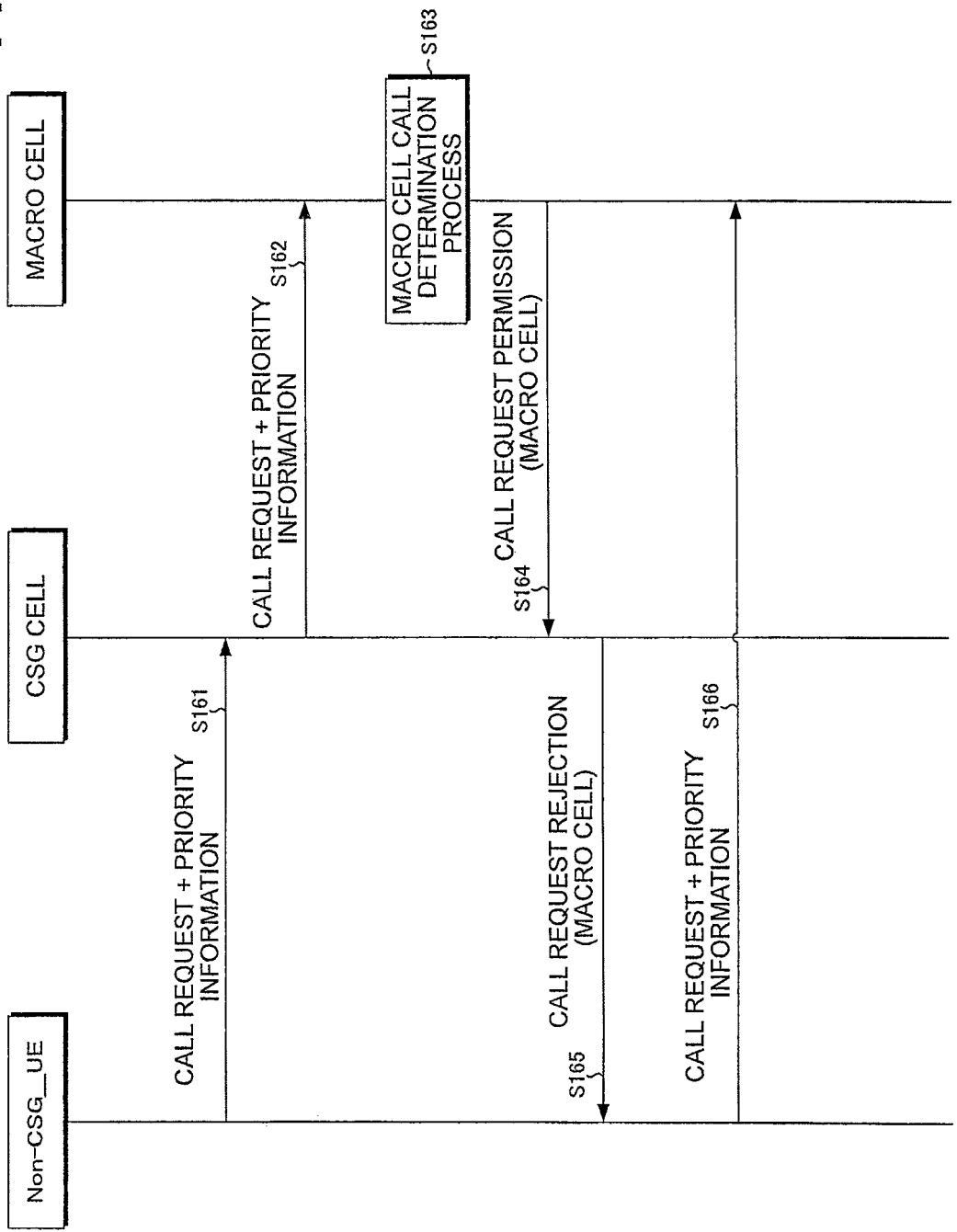
FIG. 16 is a sequence chart showing a originated call procedure of the mobile station apparatus Non-CSG_UE of the present invention.
Figure 17:
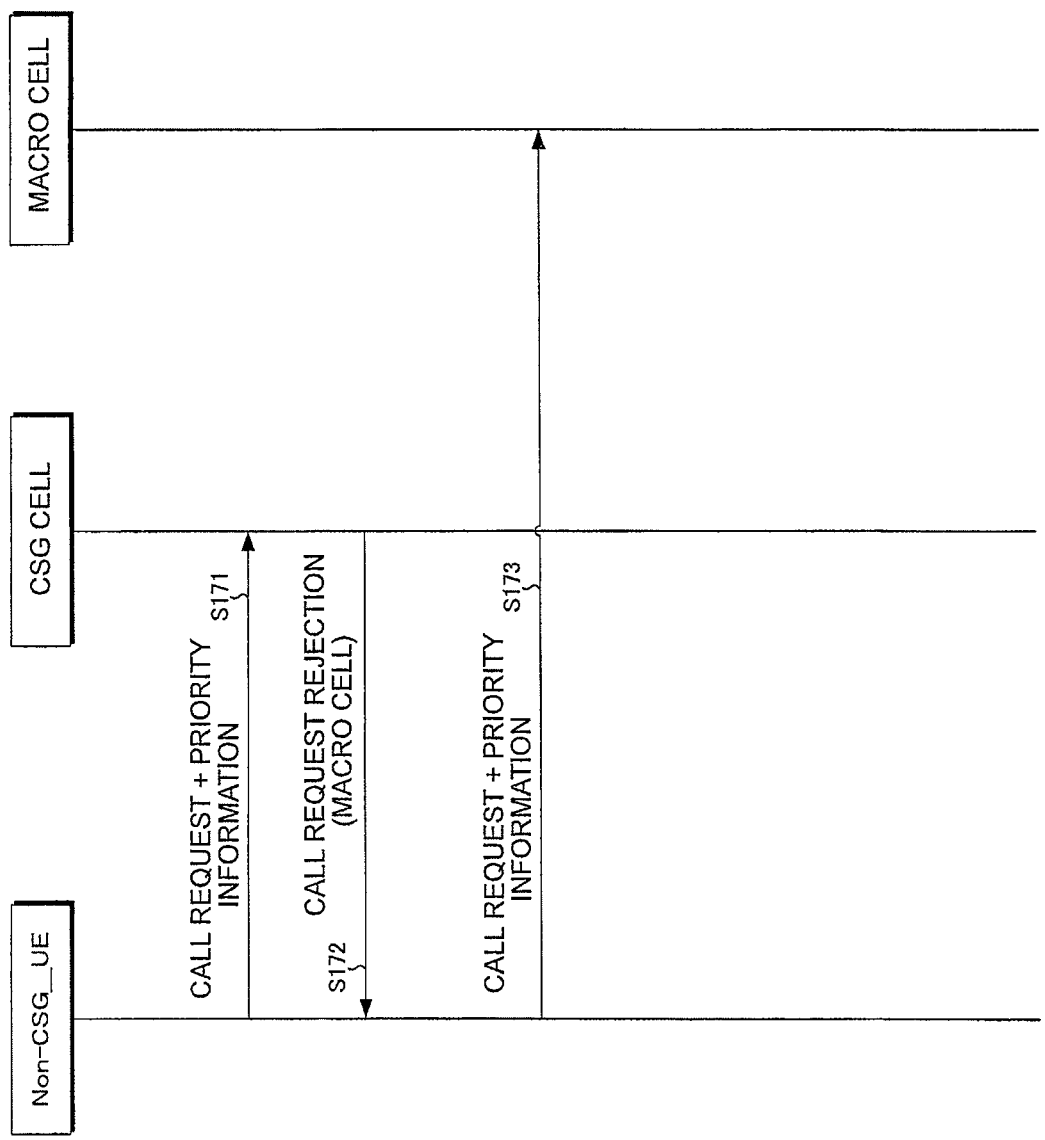
FIG. 17 is a sequence chart showing another originated call procedure of the mobile station apparatus Non-CSG_UE of the present invention.

FIGS. 16 and 17 are sequence charts showing a originated call procedure of the mobile station apparatus Non-CSG_UE of the present invention. This sequence is suitable for cases such as when no registered CSG cell information is stored in the mobile station apparatus (for example, a SIM card is not inserted), when the mobile station apparatus does not support a CSG cell, or when the mobile station apparatus has selected an unregistered CSG cell as the camped-on destination cell and is camping on the unregistered CSG cell. In addition, the macro cell in the drawings is a macro cell which is closest to the CSG cell. The macro cell closest to the CSG cell indicates the cell having the highest quality selected as a result of measuring neighboring cells by the mobile station apparatus or the CSG cell, and is a macro cell covering the cell radius of the CSG cell, for example. This information may be registered only once when the CSG cell is powered on, or the content of registration may be changed at a regular interval based on the measurement result.

In FIG. 16, the sequence until selecting an unregistered CSG cell by the idle determination process and camping on the CSG cell is identical to that of FIG. 5. The present invention can be applied to both a normal call and a priority call. When the mobile station apparatus camping on the CSG cell receives a originated call request from the upper layer and performs a originated call process, it transmits a originated call request message having included therein at least priority information indicating the priority of the call and a temporary user identifier (user identification information) to the CSG cell (step S161). The CSG cell transfers the originated call request message to the closest macro cell (step S162). The macro cell to which the originated call request message is transferred receives the transferred originated call request, checks the content of the priority information in the macro cell originated call determination process (step S163) and, it is determined whether or not the mobile station apparatus can be accommodated based on the type of call requested by the mobile station apparatus, the number of mobile station apparatuses communicating in the macro cell, the amount of traffic and the radio resource usage status, and, if accommodation is possible, the macro cell is defined as the originated call destination cell and a originated call request permission is notified to the CSG cell (step S164).

The CSG cell acquires information of the macro cell included in the originated call request permission message, includes the information in a originated call request rejection message, and notifies the mobile station apparatus of the message (step S165). The mobile station apparatus which received the originated call request rejection message acquires the information of the macro cell included in the originated call request rejection message and, if necessary, broadcast information from the broadcast channel of the macro cell, and transmits a originated call request message to the macro cell after a random access procedure (not shown) (step S166). The information of the macro cell included in the originated call request rejection message includes at least frequency information and cell ID information. In this occasion, the originated call request permission message may include the content of the broadcast information of the macro cell and preamble information for use in the random access procedure. In FIG. 16, description of other channels transmitted from the CSG cell and the macro cell is omitted.

If the originated call request is rejected in the macro cell too, a originated call request rejection message is transmitted from the CSG cell without the macro cell information being included therein. It is also possible to include all or a part of a process similar to that of FIG. 16, not in a macro cell, but in a management device belonging to an upper-layer network such as, for example, MME (Mobility Management Entity), S-GW (Serving Gateway), or the like. In this case, related messages may be exchanged between the CSG cell and the management device, or messages may be exchanged between the macro cell and the management device. Since the sequence after having transmitted the originated call request message to the macro cell is identical to the conventional sequence, description thereof is omitted.

FIG. 17 is a sequence chart showing the originated call procedure of the mobile station apparatus Non-CSG_UE of the present invention. The sequence until selecting an unregistered CSG cell by the idle determination process and camping on the CSG cell is identical to that of FIG. 5. The present invention can be applied to both a normal call and a priority call. When the mobile station apparatus camping on the CSG cell receives a originated call request from the upper layer and performs a originated call process, it transmits a originated call request message having included therein at least priority information indicating the priority of the call and a temporary user identifier (user identification information) to the CSG cell (step S171). The CSG cell includes the preliminary stored information of the closest macro cell in a originated call request rejection message and notifies the mobile station apparatus of the message (step S172). The mobile station apparatus which received the originated call request rejection message acquires the information of the macro cell included in the originated call request rejection message and, if necessary, broadcast information from the broadcast channel of the macro cell, and transmits a originated call request message to the macro cell after a random access procedure (not shown) (step S173). The information of the macro cell included in the originated call request rejection message includes at least cell ID information and, if it is a cell having a different frequency, frequency information is also included. In this occasion, the originated call request rejection message may include the content of the broadcast information of the macro cell and preamble information for use in the random access procedure. Furthermore, it may include the wait time after the originated call request rejection message is received until starting the random access. In FIG. 17, description of other channels transmitted from the CSG cell and the macro cell is omitted. Since the sequence after having transmitted the originated call request message to the macro cell is identical to the conventional sequence, description thereof is omitted.

Figure 18:
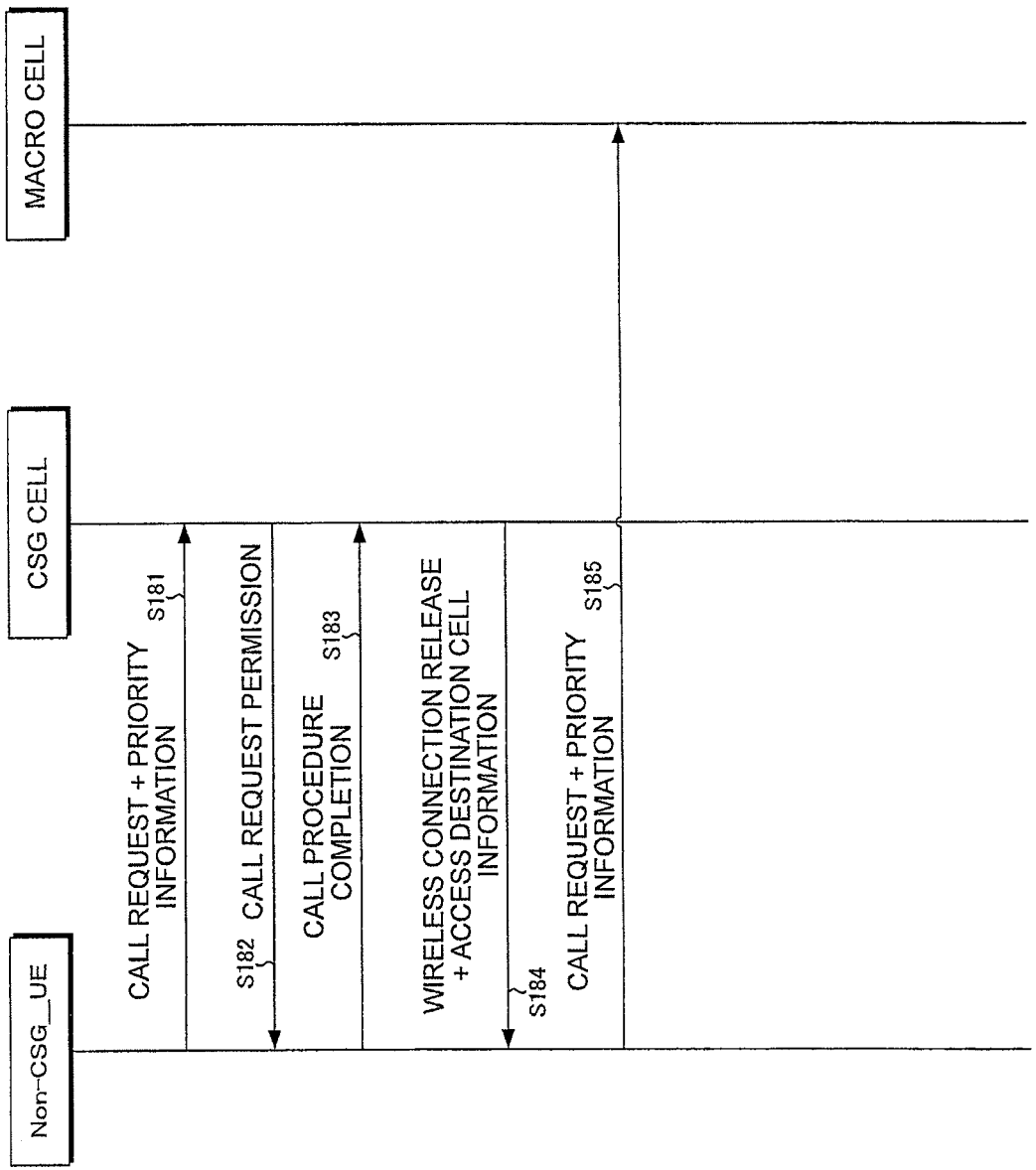
FIG. 18 is a sequence chart showing another originated call procedure of the mobile station apparatus Non-CSG_UE of the present invention.
Figure 19:
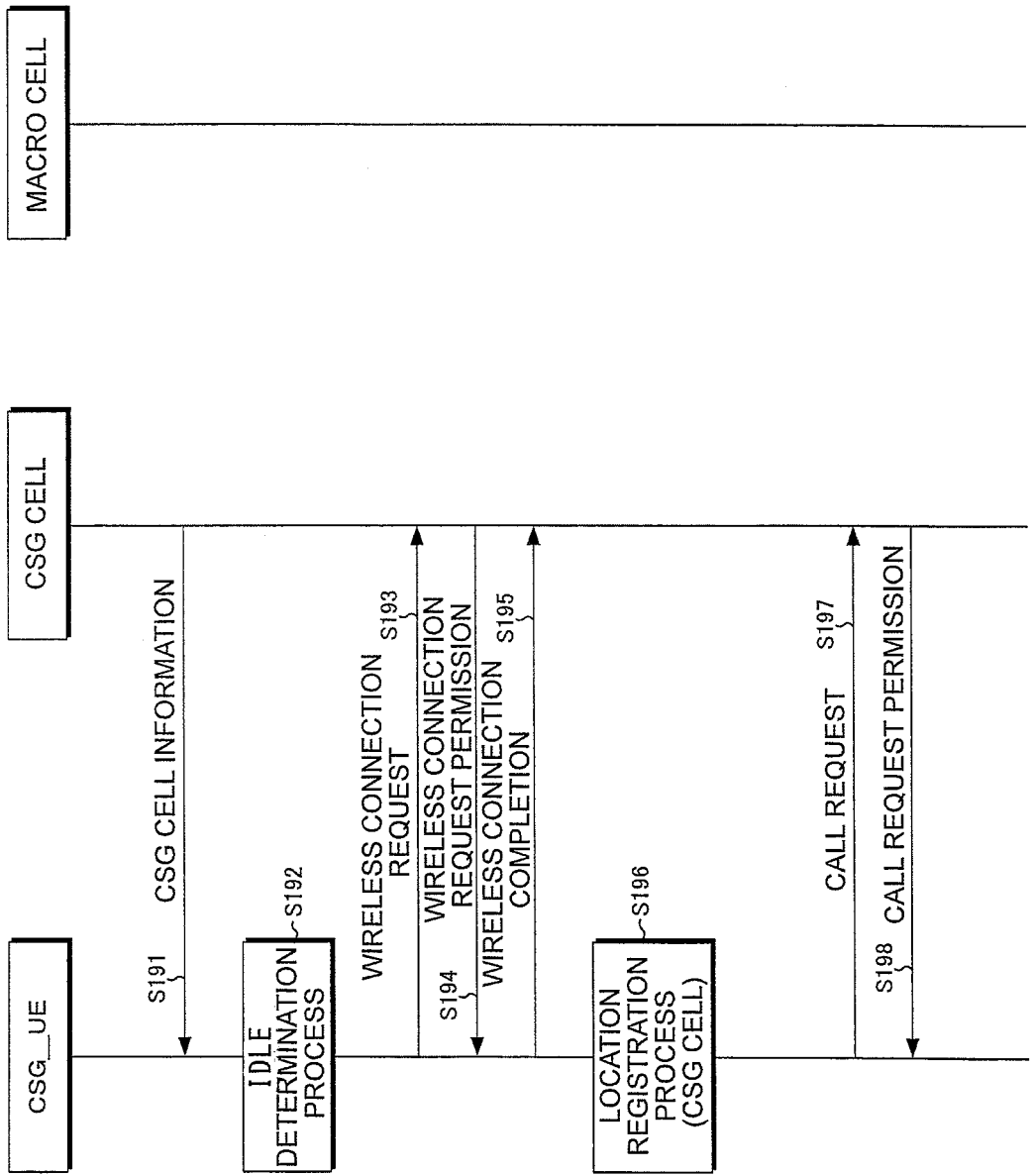
FIG. 19 is a sequence chart showing an initial access procedure of the mobile station apparatus when a registered CSG cell is placed among neighboring cells.
Figure 20:
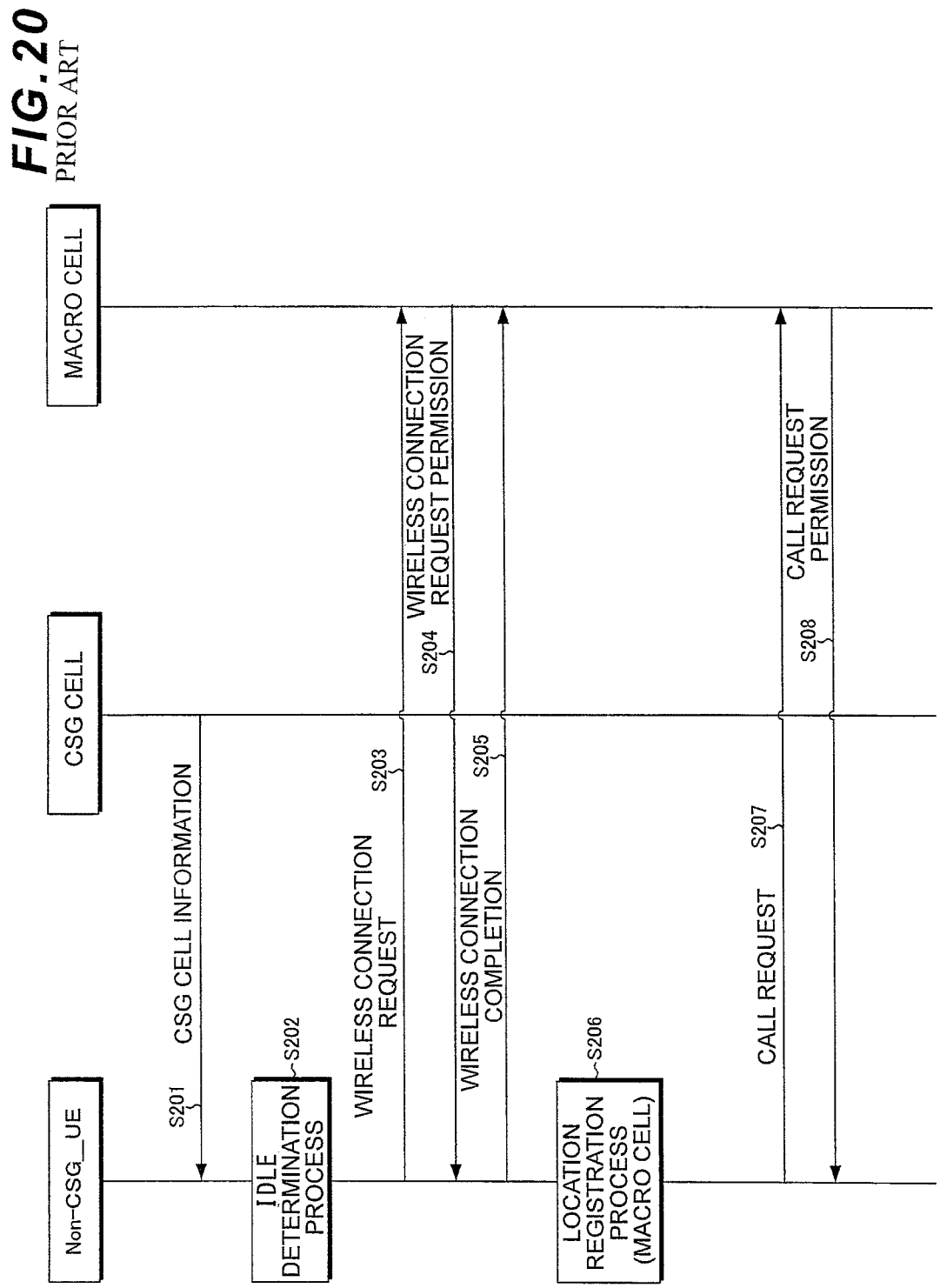
FIG. 20 is a sequence chart showing an initial access procedure when an unregistered CSG cell is placed among neighboring cells, or when the mobile station apparatus does not support a CSG cell.
Figure 21:
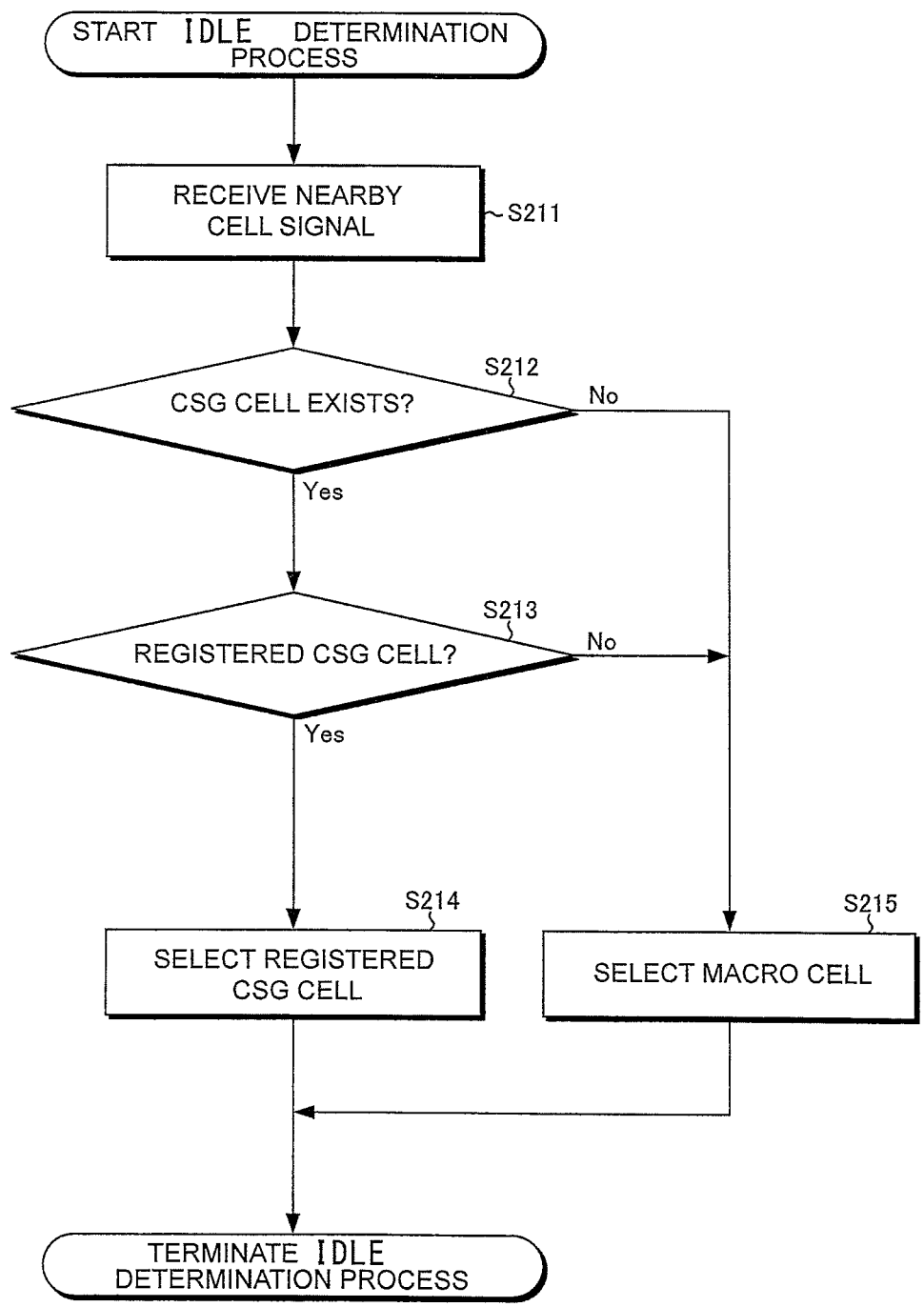
FIG. 21 is a flow chart showing a procedure of the idle determination process shown in FIGS. 19 and 20.

As shown in FIG. 18, a similar effect can be acquired (steps S184 and S185) by including the information of the cell to be accessed (macro cell information) in the wireless connection release message after receiving the originated call request once (steps S181 to S183). In the case of FIG. 18, cell search time and idle determination processes are performed again because wireless connection is released. Accordingly, although the required time until the originated call successes is longer, it becomes possible to guide a originated call request to an appropriate cell without changing the originated call procedure from the usual one.

According to the present embodiment, the mobile station apparatus enters the idle mode in the best cell regardless of existence or nonexistence of registered CSG cell information, or whether or not it is an unregistered CSG cell. Furthermore, even if the originated call request message to the base station apparatus of a cell in the idle mode is rejected, the calling sequence is continued because abase station apparatus other than the originated call destination is newly specified by the originated call request rejection message as the originated call destination cell. In addition, when the base station apparatus receives a originated call request message from the mobile station apparatus and rejects the originated call request, it transmits the originated call request rejection message having another preferred cell included therein.

With the present embodiment, it becomes possible for the mobile station apparatus to continue issuing a originated call request to another preferred cell, even if the originated call request is rejected, in addition to the effect of the first embodiment, whereby the originated call success rate rises and the number of call interruptions can be further reduced.

In the embodiments described above, the mobile station apparatus and the base station apparatus may be controlled by recording a program for realizing the functions of respective components of the mobile station apparatus and the base station apparatus or a part of these functions in a computer readable recording medium, and causing a computer system to read and perform the program recorded in the recording medium. The "computer system" mentioned here is assumed to include an OS and hardware such as peripheral devices. In addition, the "computer readable recording medium" refers to portable media such as a flexible disk, a magnetooptical disk, ROM, or CD-ROM, and a storage unit such as a hard disk built in the computer system. Furthermore, it is assumed that the "computer readable recording medium" includes a medium which can keep a program dynamically for a short time such as a communication line when transmitting a program via a network such as the Internet and a communication line such as a phone line, and a medium holding a program for a certain period such as a volatile memory inside the computer system which is supposed to be a server or a client for that case. In addition, the program described above may be one that realizes a part of the above-mentioned functions, and the above-mentioned functions may be realized by a combination with the program which is already recorded in the computer system.

Although embodiments of the invention have been described in detail in the foregoing, referring to the drawings, specific configurations are not limited to the embodiments and designs in the range that does not deviate from the scope of this invention are also included in the claims.

The invention claimed is:
1. A mobile station apparatus including a processor that communicates with a base station apparatus by using a cell, the mobile station apparatus comprising:
receiving circuitry that receives an indication and one type of at least two types of access restriction information,
the indication indicating whether the cell is a Closed Subscriber Group (CSG) cell,
the CSG cell configured to restrict an access of the mobile station apparatus that is not being registered,
a first type, of the at least two types of access restriction information, indicating an access restriction related to a normal call but not an emergency call, and
a second type, of the at least two types of access restriction information, indicating an access restriction related to the emergency call but not the normal call; and
transmitting circuitry that (i) transmits a connection request message, in a case for the emergency call, to the base station apparatus based on the second type of the at least two types of access restriction information and (ii) transmits a connection request message, in a case for the normal call, to the base station apparatus based on the first type of the at least two types of access restriction information.

2. A base station apparatus including a processor that communicates with a mobile station apparatus by using a cell, the base station apparatus comprising:
- transmitting circuitry that transmits an indication and one type of at least two types of access restriction information,
  - the indication indicating whether the cell is a Closed Subscriber Group (CSG) cell,
  - the CSG cell configured to restrict an access of the mobile station apparatus that is not being registered,
  - a first type of the at least two types of access restriction information, indicating an access restriction related to a normal call but not an emergency call, and
  - a second type of the at least two types of access restriction information, indicating an access restriction related to the emergency call but not the normal call; and
- receiving circuitry that (i) receives a connection request message, in a case for the emergency call, that is transmitted from the mobile station apparatus based on the second of the at least two types of access restriction information and (ii) receives a connection request message, in a case for the normal call, that is transmitted from the mobile station apparatus based on the first type of the at least two types of access restriction information.

3. A processing method performed in a mobile station apparatus including a processor that communicates with a base station apparatus by using a cell, the processing method comprising:
- receiving an indication and one type of at least two types of access restriction information,
  - the indication indicating whether the cell is a Closed Subscriber Group (CSG) cell,
  - the CSG cell configured to restrict an access of the mobile station apparatus that are not being registered,
  - a first type of the at least two types of access restriction information, indicating an access restriction related to a normal call but not an emergency call, and
  - a second type of the at least two types of access restriction information, indicating an access restriction related to the emergency call but not the normal call;
- transmitting a connection request message, in a case for the emergency call, to the base station apparatus based on the second type of the at least two types of access restriction information, and
- transmitting a connection request message, in a case for the normal call, to the base station apparatus based on the first type of the at least two types of access restriction information.

4. A processing method performed in a base station apparatus including a processor that communicates with a mobile station apparatus by using a cell, the processing method comprising:
- transmitting an indication and one type of at least two types of access restriction information,
  - the indication indicating whether the cell is a Closed Subscriber Group (CSG) cell,
  - the CSG cell configured to restrict an access of the mobile station apparatus that is not being registered,
  - a first type of the at least two types of access restriction information, indicating an access restriction related to a normal call but not an emergency call, and
  - a second type of the at least two types of access restriction information, indicating an access restriction related to the emergency call but not the normal call;
- receiving a connection request message, in a case for the emergency call, that is transmitted from the mobile station apparatus based on the second type of the at least two types of access restriction information, and
- receiving a connection request message, in a case for the normal call, that is transmitted from the mobile station apparatus based on the first type of the at least two types of access restriction information.

5. The mobile station apparatus of claim 1, further comprising:
- measuring circuitry that measures a CSG cell and selects, as an access destination cell, the CSG cell with a higher priority than a macro cell, in a case that the CSG cell allows an access of the mobile station apparatus.

6. The processing method of claim 3, further comprising:
- measuring a CSG cell and selecting, as an access destination cell, the CSG cell with a higher priority than a macro cell, in a case that the CSG cell allows an access of the mobile station apparatus.

* * * * *